(12) United States Patent
De et al.

(10) Patent No.: US 10,541,916 B2
(45) Date of Patent: Jan. 21, 2020

(54) TUNNELED ROUTING

(71) Applicant: Google Inc., Mountain View, CA (US)

(72) Inventors: Pradip De, Fremont, CA (US); Jay D. Logue, San Jose, CA (US)

(73) Assignee: Google LLC, Mountain View, CA (US)

( * ) Notice: Subject to any disclaimer, the term of this patent is extended or adjusted under 35 U.S.C. 154(b) by 120 days.

(21) Appl. No.: 14/973,507

(22) Filed: Dec. 17, 2015

(65) Prior Publication Data

US 2016/0191380 A1    Jun. 30, 2016

Related U.S. Application Data

(60) Provisional application No. 62/093,289, filed on Dec. 17, 2014.

(51) Int. Cl.
| | | |
|---|---|---|
| *H04W 4/00* | (2018.01) | |
| *H04L 12/741* | (2013.01) | |
| *H04W 40/02* | (2009.01) | |
| *H04W 84/18* | (2009.01) | |

(52) U.S. Cl.
CPC ............ *H04L 45/74* (2013.01); *H04W 40/02* (2013.01); *H04W 84/18* (2013.01)

(58) Field of Classification Search
CPC ...................................................... H04L 45/74
See application file for complete search history.

(56) References Cited

U.S. PATENT DOCUMENTS

| | | | | |
|---|---|---|---|---|
| 8,442,011 | B1* | 5/2013 | Faccin | H04L 63/0884 370/335 |
| 8,745,381 | B2* | 6/2014 | Badea | H04L 43/50 713/160 |
| 9,112,790 | B2 | 8/2015 | Logue | |
| 9,226,142 | B2* | 12/2015 | Fukuda | H04L 63/061 |
| 9,350,605 | B2* | 5/2016 | Bhattacharya | H04L 45/50 |
| 9,641,551 | B1* | 5/2017 | Kariyanahalli | H04L 63/164 |
| 9,912,612 | B2* | 3/2018 | Sabaa | H04L 49/15 |
| 2002/0174251 | A1* | 11/2002 | Lasserre | H04L 12/4633 709/249 |
| 2004/0160952 | A1* | 8/2004 | Borella | H04W 88/06 370/355 |
| 2006/0083229 | A1* | 4/2006 | Jordan | H04L 12/2854 370/389 |
| 2009/0265543 | A1* | 10/2009 | Khetawat | H04L 63/104 713/151 |
| 2009/0325484 | A1* | 12/2009 | Lele | H04W 8/205 455/41.1 |
| 2010/0002660 | A1* | 1/2010 | Grayson | H04W 36/0033 370/338 |
| 2010/0232503 | A1* | 9/2010 | Morimoto | H04W 76/12 375/240.13 |
| 2011/0176469 | A1* | 7/2011 | Kim | H04W 84/22 370/311 |

(Continued)

*Primary Examiner* — Guang W Li
(74) *Attorney, Agent, or Firm* — Colby Nipper PLLC

(57) ABSTRACT

Systems and methods relating to transmitting data between an internetwork of multiple networks. The transmitted data uses a device address that uses a common addressing scheme regardless of network protocols used to implement the multiple networks. The multiple networks includes networks having multiple network protocols, and the multiple networks extend a connection from a home network to a service using a tunnel.

20 Claims, 28 Drawing Sheets

(56) References Cited

U.S. PATENT DOCUMENTS

| | | | |
|---|---|---|---|
| 2013/0034112 A1* | 2/2013 | Zhang | H04L 63/0281 |
| | | | 370/475 |
| 2013/0094360 A1* | 4/2013 | Luft | H04W 28/12 |
| | | | 370/235 |
| 2015/0009995 A1* | 1/2015 | Gross, IV | H04L 45/74 |
| | | | 370/392 |
| 2016/0094398 A1* | 3/2016 | Choudhury | H04L 45/42 |
| | | | 370/254 |
| 2016/0135074 A1* | 5/2016 | Welin | H04L 63/0272 |
| | | | 370/235 |
| 2017/0104851 A1* | 4/2017 | Arangasamy | H04L 69/22 |
| 2017/0272316 A1* | 9/2017 | Johnson | G06Q 10/103 |
| 2018/0248985 A1* | 8/2018 | Liu | H04L 69/16 |

\* cited by examiner

TUNNELED ROUTING

CROSS-REFERENCE TO RELATED APPLICATIONS

This application claims the benefit of Provisional Application Ser. No. 62/093,289, filed Dec. 17, 2014, entitled "Tunneled Routing in a Low-Power Wireless Network," which is incorporated by reference herein in its entirety.

BACKGROUND

This disclosure relates to a fabric network that couples electronic devices using one or more network types. Specifically, this disclosure relates to dynamically requesting and/or receiving acknowledgment messages.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes. Some of these devices are often capable of communicating with each other through one or more networks. However, transient devices—for instance, mobile phones or other personal devices—may benefit from being connected to the network-connected devices in a reliably addressed connection regardless of whether the transient devices are currently in a common network with the network-connected devices or are remote from the network. Long polling may be used to communicate to these transient devices when they are remote from the network, but long polling does not allow every device in the fabric to communicate with a remote transient device with a dedicated poll communication. Furthermore, long polling may only be initiated from one direction. For example, when a device from the common network is to communicate with the remote transient device via long polling, the device from the common network may wait for a long poll from the remote transient device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods a fabric network that includes one or more logical networks that enables devices connected to the fabric to communicate with each other using a list of protocols and/or profiles known to the devices. The communications between the devices may follow a particular message format that enables the devices to understand communications between the devices regardless of which logical networks the communicating devices are connected to in the fabric. Within the message format, a payload of data may be included for the receiving device to store and/or process. The format and the contents of the payload may vary according to a header within the payload that indicates a profile (including one or more protocols) and/or a type of message that is being sent according to the profile.

Embodiments of the present disclosure relate generally to an addressing architecture may uniquely organize addresses that allow a home network to effectively extend into a remote service to address remote transient devices as if the devices in the service and/or connected to the service are in the home network. As discussed below, the remote transient device may be a transient device that enters and exit the network. Using addressing, the transient device may have messages delivered to the transient device regardless of whether the transient device is in or outside of the home network. Furthermore, alternative communication paths are available for communication. Thus, if a router fails or some communication path (e.g., Internet) communication may still be available.

In some embodiments, the transient device may be addressed the same regardless of whether the transient device is in the home network or outside of the network. However, when the transient device is inside of the home network, the messages may use a tunnel shortcut that effectively cuts out the service when the transient device is inside the home network to reduce transmission length and potential bottlenecks.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
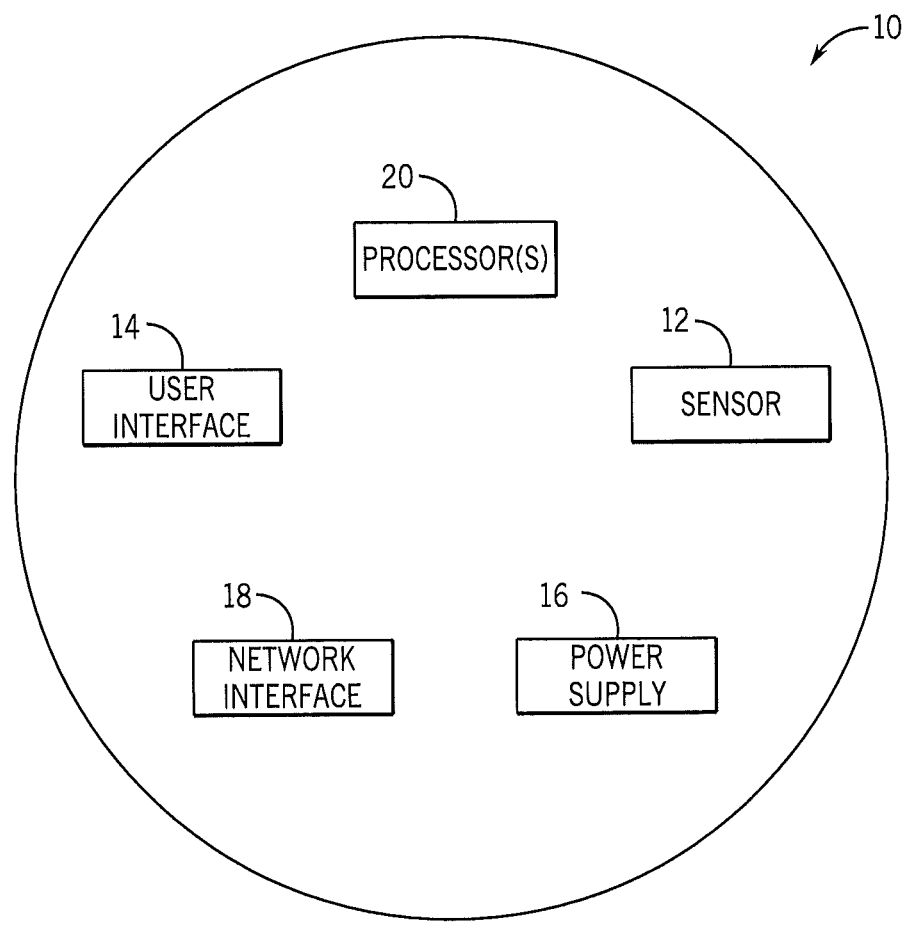
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that all of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating these devices efficiently, consumers generally prefer to use user-friendly devices that include robust connectivity. For example, an addressing architecture may uniquely organize addresses that allow a home network to effectively extend into a remote service to address remote transient devices as if the devices in the service and/or connected to the service are in the home network. As discussed below, the remote transient device may be a transient device that enters and exit the network. Using addressing, the transient device may have messages delivered to the transient device regardless of whether the transient device is in or outside of the home network.

In some embodiments, the transient device may be addressed the same regardless of whether the transient device is in the home network or outside of the network. However, when the transient device is inside of the home network, the messages may use a tunnel shortcut that effectively cuts out the service when the transient device is inside the home network to reduce transmission length and potential bottlenecks.

Furthermore, such addressing may be used even when a transient device is not used in the networks. Instead, the tunneling schemes discussed herein may be used to enable devices (e.g., a door lock) to communicate with a service through a tunnel that occurs through another device (e.g., camera) on a common network (e.g., 802.15.4 or thread) that may also extend through other networks when connecting to the service. For example, a door lock may have only a first network interface (e.g., 802.15.4), but a smart camera may be connected to the door lock via the network interface and connected to a remote service via another network (e.g., WiFi). Thus, only half the tunnel may be used since the other half of the tunnel that extends from the service to a transient device may be ignored since the communication is intended for the service.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6) communication such that each connected device may have a unique local address (LA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv4 and/or IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
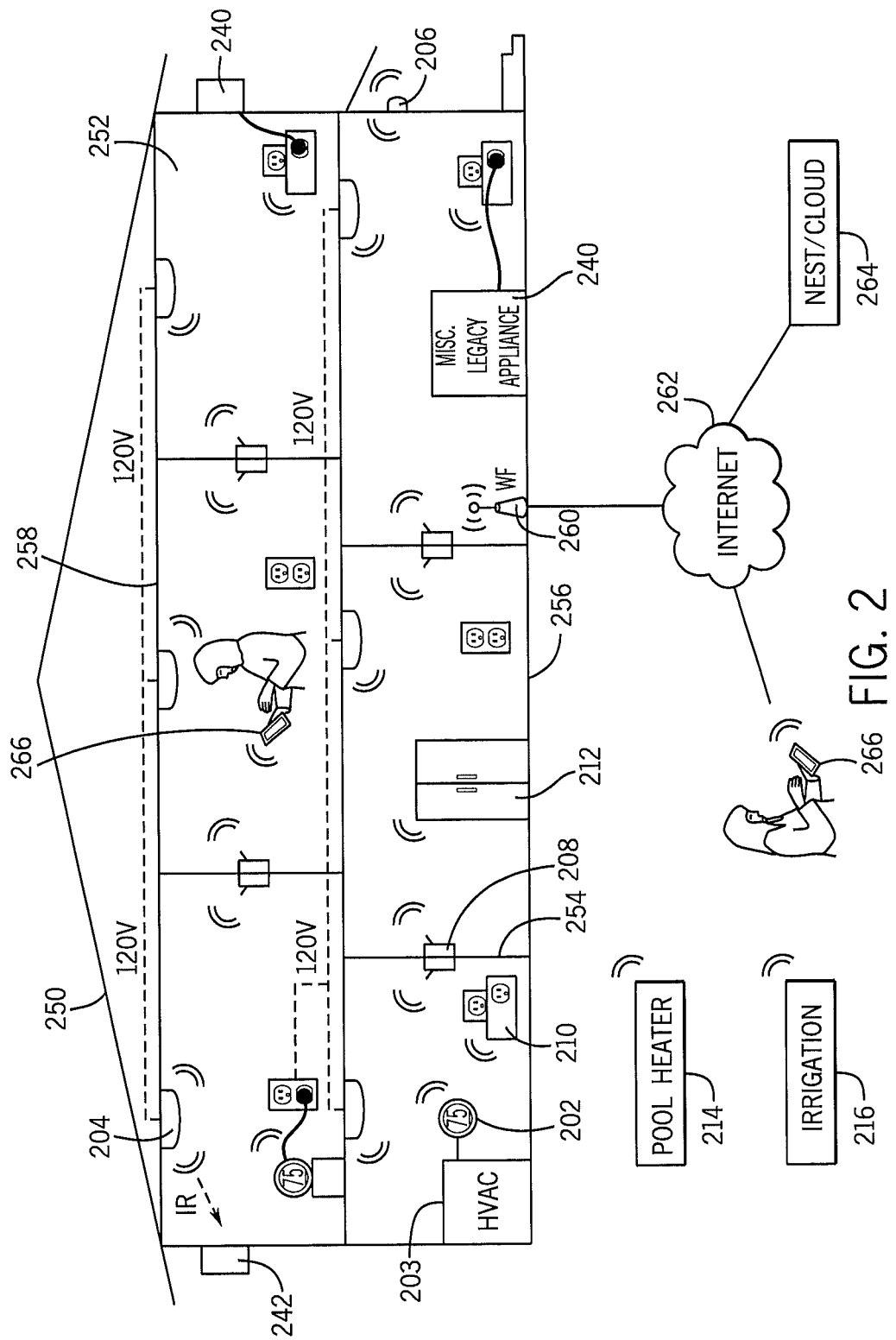
FIG. 2 illustrates a block diagram of a home environment in which the general device of FIG. 1 may communicate with other devices via the fabric network, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infrared (IR) controlled wall air conditioners or other IR-controlled devices, which can be controlled by IR signals provided by the hazard detection units 50 or the light switches 54.

Figure 3:
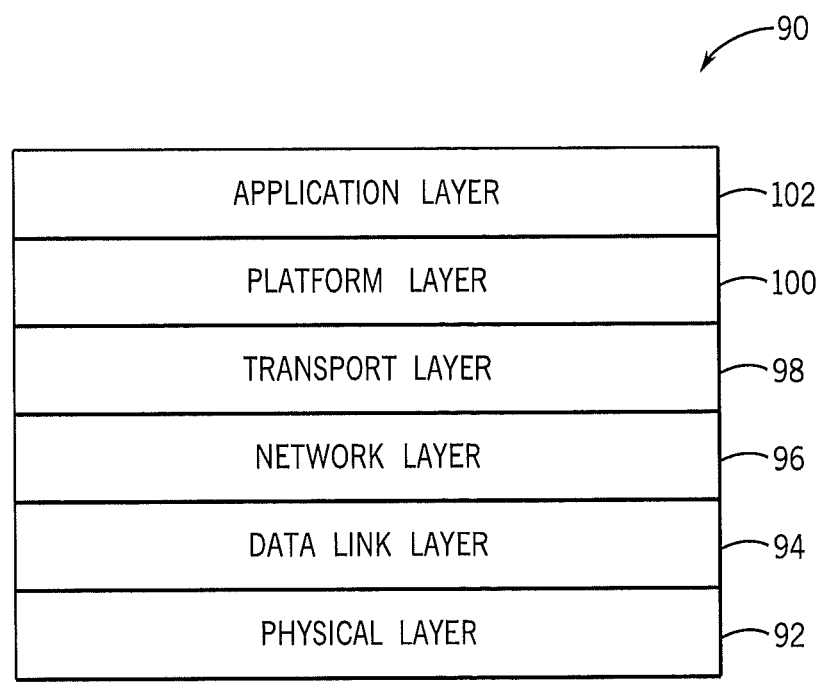
FIG. 3 illustrates a block diagram of an Open Systems Interconnection (OSI) model that characterizes a communication system for the home environment of FIG. 2, in accordance with an embodiment.

As mentioned above, each of the example devices 10 described above may form a portion of a fabric network. Generally, the fabric network may be part of an Open Systems Interconnection (OSI) model 90 as depicted in FIG. 3. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable network type (e.g., WiFi, Ethernet, HomePlug, 802.15.4, etc) that may transmit using IPv6 or IPv4 protocols.

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP) or other suitable transport protocols.

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. A-C illustrate three embodiments that may be used to connect electrical devices via one or more sub-networks in the fabric.

A. Single Network Topology

Figure 4:
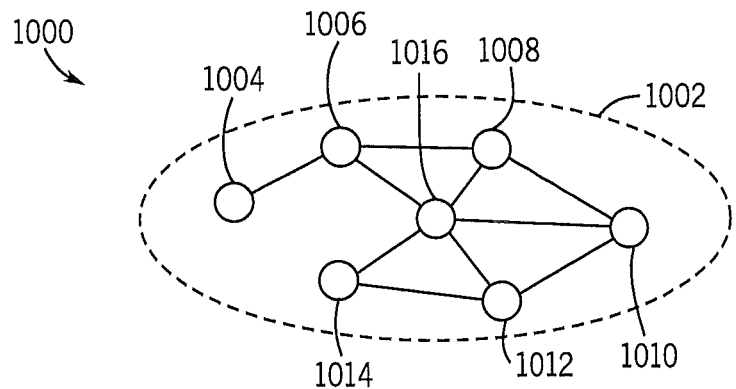
FIG. 4 illustrates the fabric network having a single logical network topology, in accordance with an embodiment.

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv4 or IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

Figure 5:
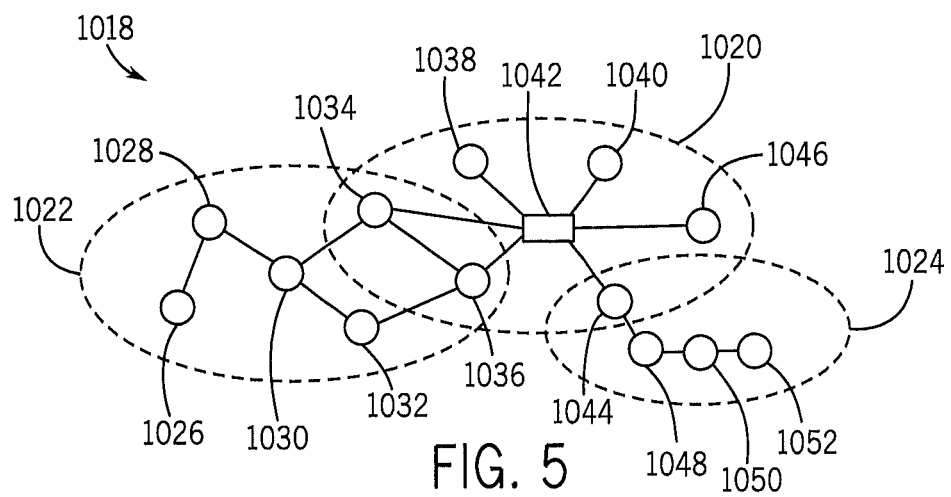
FIG. 5 illustrates the fabric network having a star network topology, in accordance with an embodiment.

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

Furthermore, in some embodiments, as previously discussed, at least some of end nodes (e.g., node 1026) may be sleepy nodes that connect to one or more parent routers (e.g., node 1028) that are used to store messages while the sleepy nodes are in a sleep state.

C. Overlapping Networks Topology

Figure 6:
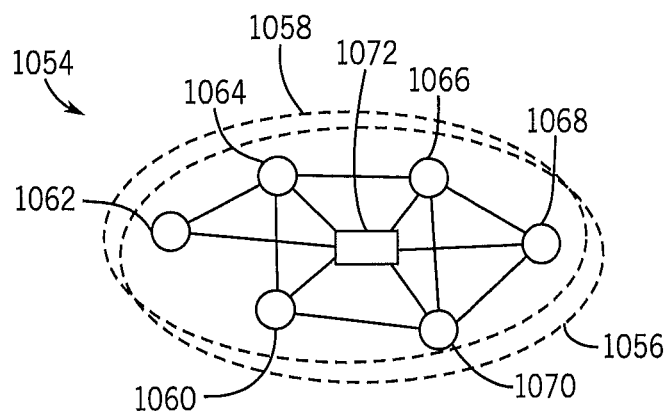
FIG. 6 illustrates the fabric network having an overlapping networks topology, in accordance with an embodiment.

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
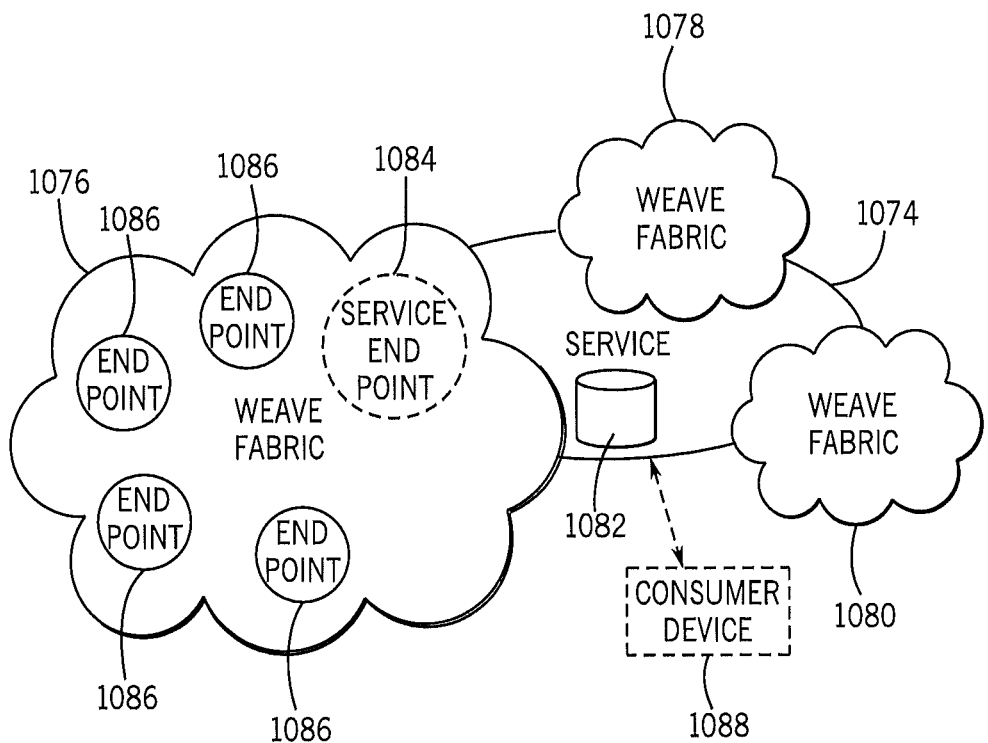
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
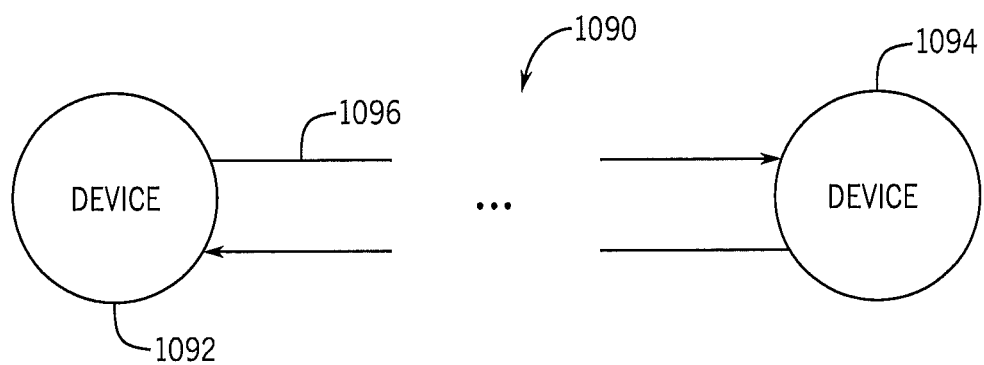
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast (e.g., UDP with or without acknowledgment requests).

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA) and/or global addresses, with a LLA assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
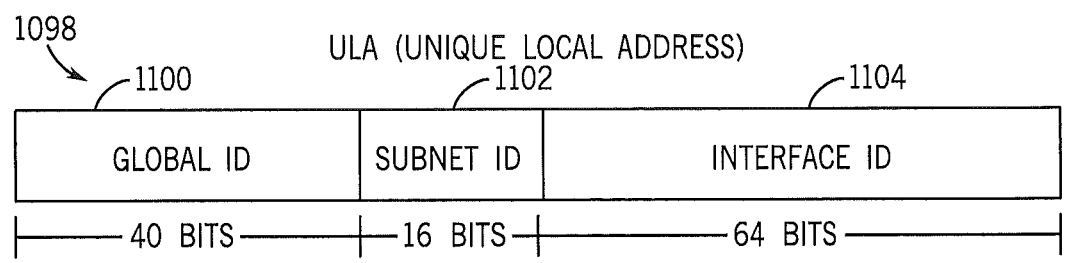
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 may be included in a fabric ID for the fabric.

The fabric ID is a unique 64-bit identifier used to identify a fabric. The fabric ID may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID. In certain embodiments, once the fabric ID is created with the fabric, the fabric ID remains until the fabric is dissolved.

The global ID 1100 identifies the fabric to which the node belongs. The subnet ID 1102 identifies logical networks within the fabric. The subnet ID F3 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 10:
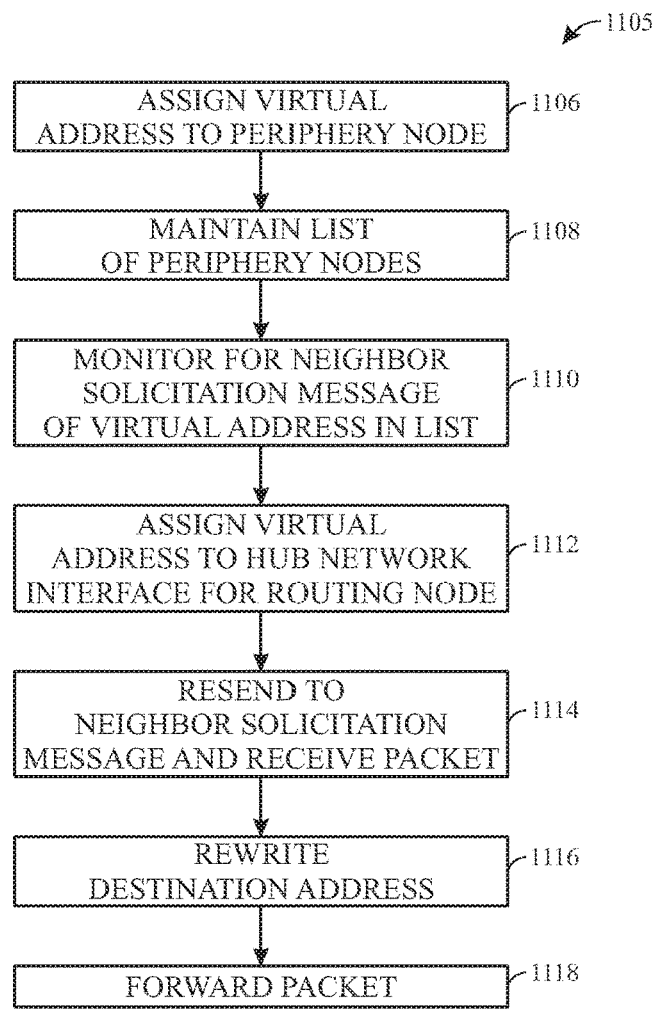
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

A. Tunneling Across Networks

As previously noted, messages may be sent from devices within a local network (e.g., home area network HAN) to transient devices within the network and to the same devices when the devices are outside the HAN. Additionally or alternatively, the devices in the local network may communicate with remote devices that do not physically enter into the local network, but the remote devices are capable of speaking in a common protocol (e.g., Weave) that is spoken by devices in the fabric. The local devices and remote/transient devices may communicate using a tunnel through other networks (e.g., WiFi, Internet, etc.) and/or the service 1074. For example, devices that are transient and/or remote, a protocol address for the fabric may include an extension identifier that effectively extends the fabric into the service and to authorized devices connected thereto.

As previously noted, a fabric may be implemented as an IPv6 (or IPv4) network with each node assigned one or more IPv6 addresses which can be used to send packets to the node. Nodes can exchange packets with the other nodes in the fabric, either directly, or via intermediary nodes acting as IP routers. A fabric may span multiple network types within a single location such as Ethernet, WiFi, 802.15.4 (6LoWPAN) and power-line networks.

Figure 11:
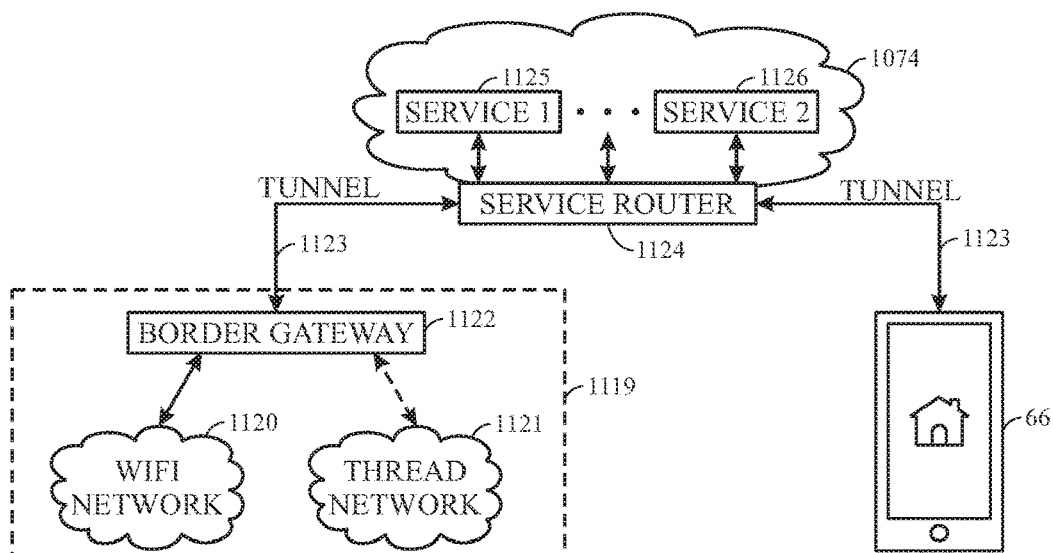
FIG. 11 illustrates a fabric having a home network with the fabric extending beyond the home network using a tunnel, in accordance with an embodiment.

FIG. 11 illustrates a fabric 1119 having a WiFi network 1120 and a Thread (802.15.4) network 1121. Although the networks 1120 and 1121 are illustrated as distinct and non-overlapping networks, these networks 1120 and 1121 may share at least one device, such as a border gateway device 1122. The border gateway device 1122 routes communication protocol (e.g., Weave) messages to/from the service 1074 and any authorized device in the fabric 1119. In other words, the border gateway device 1122 is tasked with exchanging messages with the service 1074 through a tunnel 1123 for the rest of the fabric 1119.

As illustrated, the service 1074 includes subservices 1125 and 1126. Like the service 1074, the subservices 1125 and 1126 include collections of hardware and software that provides a suite of data access, storage, synchronization, and/or transport resources to hardware devices and user client applications. However, the subservices 1125 and 1126 may be more specifically organized to particular tasks, such as interfacing with devices outside the service 1074 or transporting information from the service 1074 to other devices (e.g., smart device 66).

Messages that are addressed to go outside a local location (e.g., home network) from a device in the local location, would be routed to the border gateway device 1122 via IPv6 routing. Thereafter, the border gateway device 1122 tunnels the messages to the service 1074 via a service router (SR) 1124 over an authenticated and/or encrypted channel.

The SR 1124 would have configured routes that it could use to further route the message to any service endpoint (e.g., subservices 1125 and 1126) or to a smart device 66. The channel to a mobile smart device 66 would be another authenticated and/or encrypted tunnel as a logical continuation of the tunnel 1123.

The border gateway device 122 would be tasked with forwarding all IPv6 or IPv4 packets destined to a service endpoint or a transient device to be tunneled to the SR 1124. Conversely, all tunneled IPv6 or IPv4 packets coming from the service 1074 would be de-capsulated from the tunnel 1123 and forwarded as raw IPv6 packets to the local endpoints.

A tunnel pseudo-interface would be created on the border gateway 1122 and, subsequently, an API construct may be used this tunnel interface as part of the Inet layer as a tunnel endpoint.

a. Inet Layer Construct

The tunnel interface creation and management on the border gateway device 1122 may be platform-specific. Thus, an application interface that is abstracted out from the platform underneath and provides a clean set of APIs for the routing application software running atop (i.e., Tunnel Agent) to forward packets may be included.

The Inet layer would be extended to provide a new endpoint (e.g., TunnelEndPoint) to a tunnel virtual interface that a tunnel agent could use to send and receive packets. The TunnelEndPoint object may provide the same APIs to send/receive IPv6 or IPv4 messages over linux sockets based platform or LwIP.

The broad set of APIs provided by the TunnelEndpoint class in Inet layer would be to open/close the tunnel interface and send/receive tunneled IPv6 or IPv4 packets to/from it. In addition, APIs may bring the interface up or down and assign IPv6 or IPv4 addresses to the interface.

b. Tunnel Agent

The tunnel agent is the primary application that uses the APIs exposed by the Tunnel EndPoint in the Inet layer to tunnel IPv6 or IPv4 packets to/from the various interfaces (e.g., the tunnel interface representing the interface for packets to/from the HAN and the Nest Service 1074 interface). The working principle of the tunnel agent would be to have respective handlers registered as callbacks for events (e.g., receipt of packets) on each of these interfaces. The handlers would effectively perform encapsulation/decapsulation of tunnel headers and forward the IPv6 packets across these interfaces.

Figure 12A:
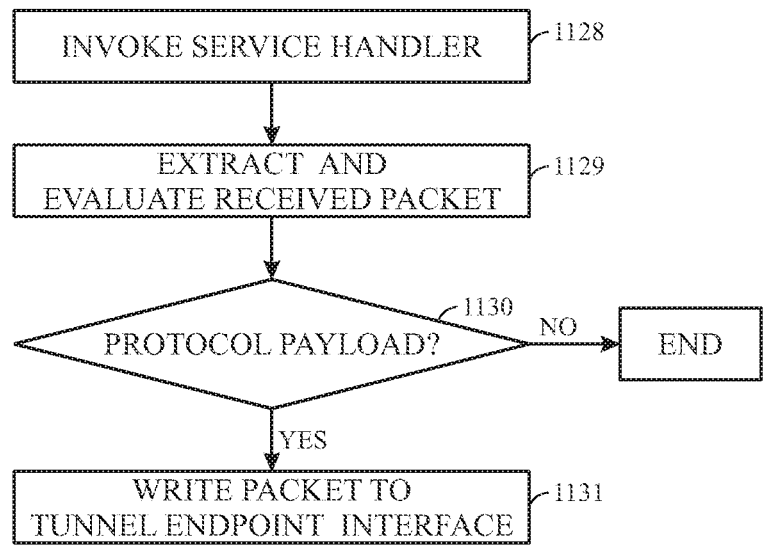
FIG. 12A illustrates a flow chart diagram for a tunnel agent when a packet is received over a service socket interface, in accordance with an embodiment.

For example, the algorithm for the tunnel agent may include a process 1128 as illustrated in FIG. 12A for when a packet is received over a service socket interface. In other words, the data may be received over a pre-established secure TCP connection from the service 1074. The tunnel agent invokes a service connection receive handler (block 1128) that extracts and evaluates the encapsulated IPv6 or IPv4 packet (block 1129). For example, the data is evaluated to determine whether the data has a protocol payload (block 1130). For example, a receiver handler may determine whether the message has a Weave payload. If the destination is within connected networks (WiFi, Thread, etc.), the tunnel agent writes the packet into tunnel endpoint interface (block 1131).

Figure 12B:
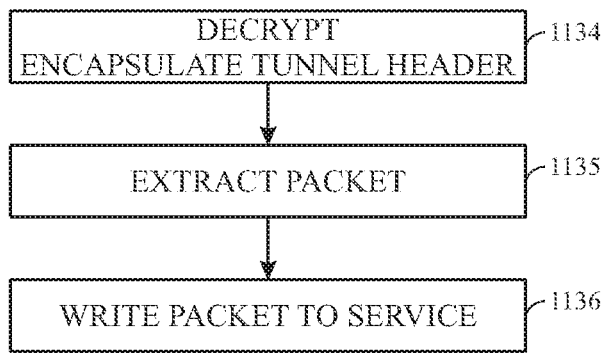
FIG. 12B illustrates a flow chart diagram for a tunnel agent when a packet is received via a network interface, in accordance with an embodiment.

FIG. 12B illustrates a flow diagram for when the packet is received over the tunnel interface, a routing table is consulted in a kernel network stack (block 1132). If the destination address is for the service, the packet is routed up the tunnel interface (block 1133). Through the tunnel interface, the packet is encapsulated in additional protocol(s) (block 1134). For example, a Weave message may be further encapsulated in a TCP/IP format in a nested format.

c. Border Gateway Actions

Figure 13:
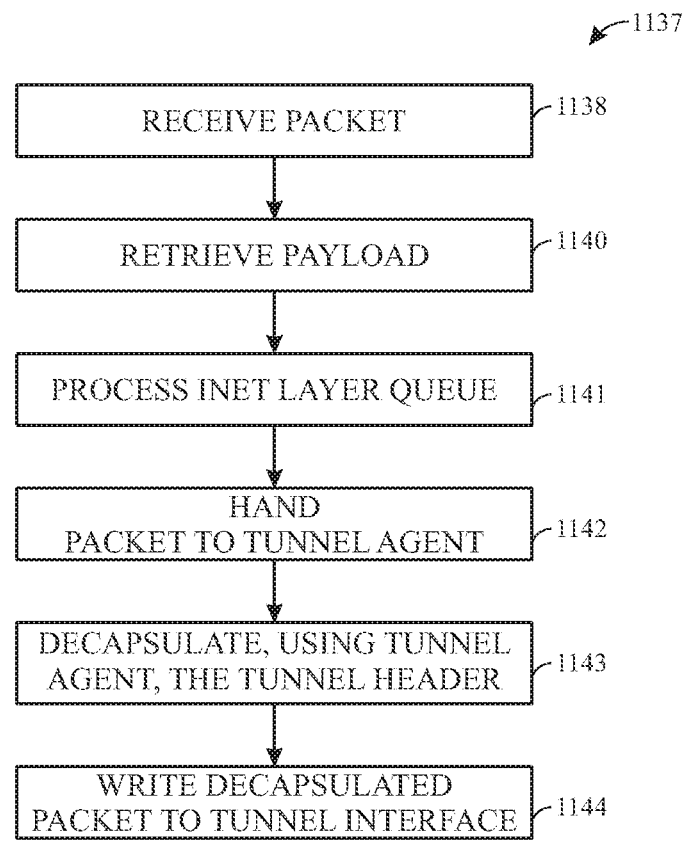
FIG. 13 illustrates a flowchart diagram of a process that may be employed by a border gateway device when receiving data from a service using sockets, in accordance with an embodiment.

Border gateway actions vary based on underlying technologies. For example, the border gateway may behave one way when dealing with Lightweight TCP/IP (LwIP) and another when using sockets i. Using Sockets FIG. 13 illustrates a process 1137 that may be employed by the border gateway device 1122 when receiving data from the service 1074 using sockets. The border gateway device 1122 receives a TCP/IP Packet through a network interface (e.g., 802.11) and percolates up via the TCP endpoint (block 1138). Using a TCPEndPoint PCB, the border gateway device 1122 retrieves the payload (original IPv6 packet in encapsulating header) (block 1139) and posts the packet as an event into the InetLayer event queue (block 1140). The border gateway device 1122 processes an InetLayer Queue by Application thread (block 1141) and invokes callbacks invoked to hand IPv6 packet to tunnel agent application (block 1142). The tunnel agent decapsulates the tunnel header (block 1143). For example, the tunnel agent can decapsulate/decrypt and retrieve the IPv6/IPv4 packet or can send the packet to the protocol layer (e.g. Weave) for decapsulation/decryption and receiving back the IPv6/IPv4 packet. The border gateway device 1122 writes the decrypted packet to the tunnel interface via the TunnelEndPoint API and uses the TunnelEndPoint API to write the packet to the tunnel interface to be routed (block 1144).

Figure 14:
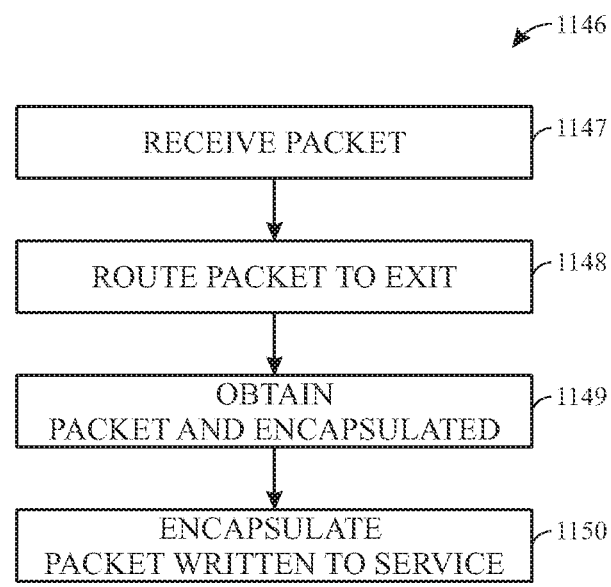
FIG. 14 illustrates a flowchart diagram of a process that may be employed by a border gateway device when receiving data from a local device in the fabric, in accordance with an embodiment.

FIG. 14 illustrates a process 1146 that may be employed by the border gateway device 1122 when receiving data from a local device in the fabric 1119. The border gateway device 1122 receives an IPv6 or IPv4 packet arrives through a network interface (e.g., 802.11 or 802.15.4) (block 1147). The border gateway device 1122 routes the packet to exit via the tunnel interface (block 1148). The packet is received as an event and posted onto the Inet layer event queue to be handled by the TunnelEndPoint. The tunnel agent for the border gateway device 1122 obtains the packet and encapsulates it by encapsulating/encrypting itself or sending to the protocol layer to do so (block 1149). The encapsulated/encrypted packet is written to the service 1074 down through the TCP/IP (block 1150).

ii. Using LwIP

Figure 15:
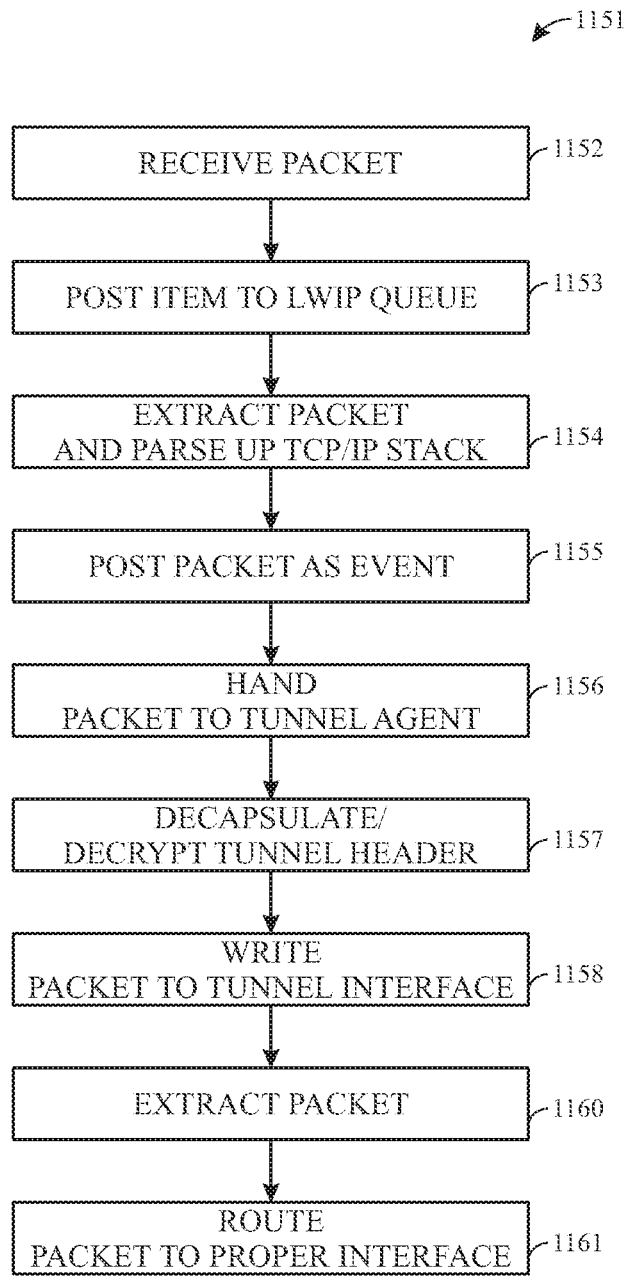
FIG. 15 illustrates a flowchart diagram of a process that may be employed by the border gateway device when receiving data from a service using Lightweight Internet Protocol (LwIP), in accordance with an embodiment.

FIG. 15 illustrates a process 1151 that may be employed by the border gateway device 1122 when receiving data from the service 1074 using LwIP. A TCP/IP packet arrives (block 1152) and posted as a work item in the LwIP queue (block 1153). LwIP thread context extracts packet and parsed up the TCP/IP stack (block 1154). The border gateway device 1122 then posts the packet as an event into the InetLayer event queue allowing the LwIP thread to retract (block 1155). The InetLayer Queue is processed by the application thread and callbacks are invoked to hand IPv6 packet to tunnel agent application (block 1156). The tunnel agent decapsulates/decrypts the tunnel header directly or hands off to the communication protocol layer for decapsulation/decryption (block 1157). The tunnel agent writes the IPv6 packet to the tunnel interface via the TunnelEndPoint API. This, effectively, calls an input function on the LwIP tunnel and posts the packet as a work item into the LwIP mailbox queue allowing the application thread to retract (block 1159). The LwIP thread context extracts packet (block 1160). The LwIP stack parses it up IPv6 layer, then looks up route table and sends it down the correct interface (e.g., 802.15.4, 802.11, BLE) (block 1161).

Figure 16:
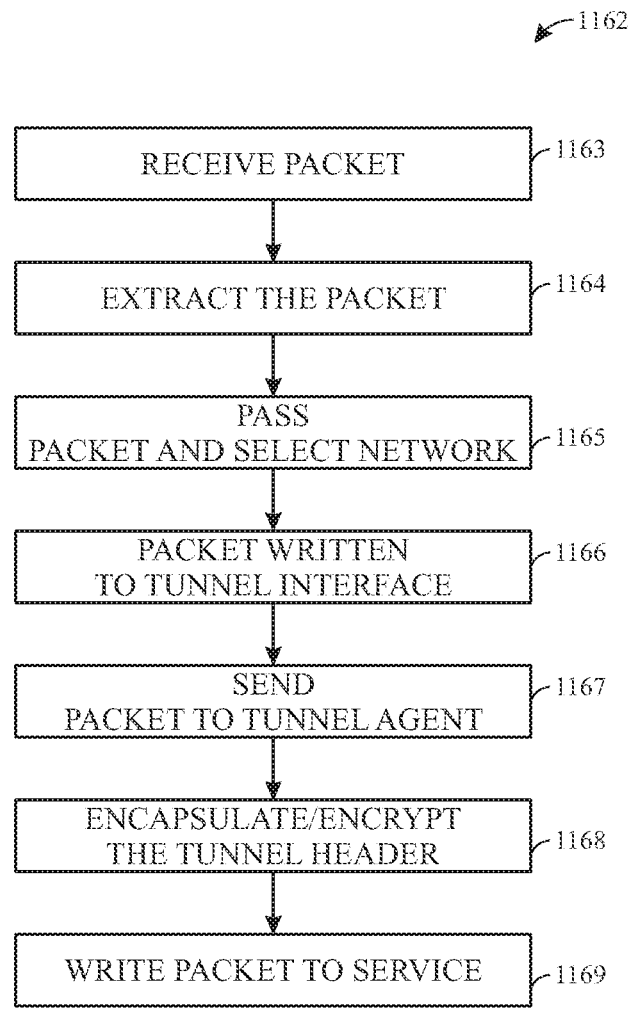
FIG. 16 illustrates a flowchart diagram of a process that may be employed by a border gateway device when receiving data from a local device to be sent to the service, in accordance with an embodiment.

FIG. 16 illustrates a process 1162 that may be employed by the border gateway device 1122 when receiving data from a local device to be sent to the service 1074. The border gateway device 1122 receives an IPv6/IPv4 packet through a network interface (e.g., 802.11, 802.15.4, or BLE interface) that is posted as a work item in the LwIP mailbox queue (block 1163). The LwIP thread context extracts the packet (block 1164). The LwIP stack passes the packet up IPv6 layer, then looks up route table to select the network through which the message is to be communicated (block 1165). For example, the packet may be written to output function of tunnel interface netif interface posting the packet as an event in the InetLayer event queue and allowing the LwIP thread to retract (block 1166). The Inet layer processes the event queue and transfers the packet to the tunnel agent application (block 1167). The tunnel agent encapsulates/ encrypts the tunnel header directly or hands off to the communication protocol layer for encapsulation/encryption (block 1168). The tunnel agent then writes the encapsulated and/or encrypted packet to the service 1074 (block 1169).

d. Service Router

Figure 17:
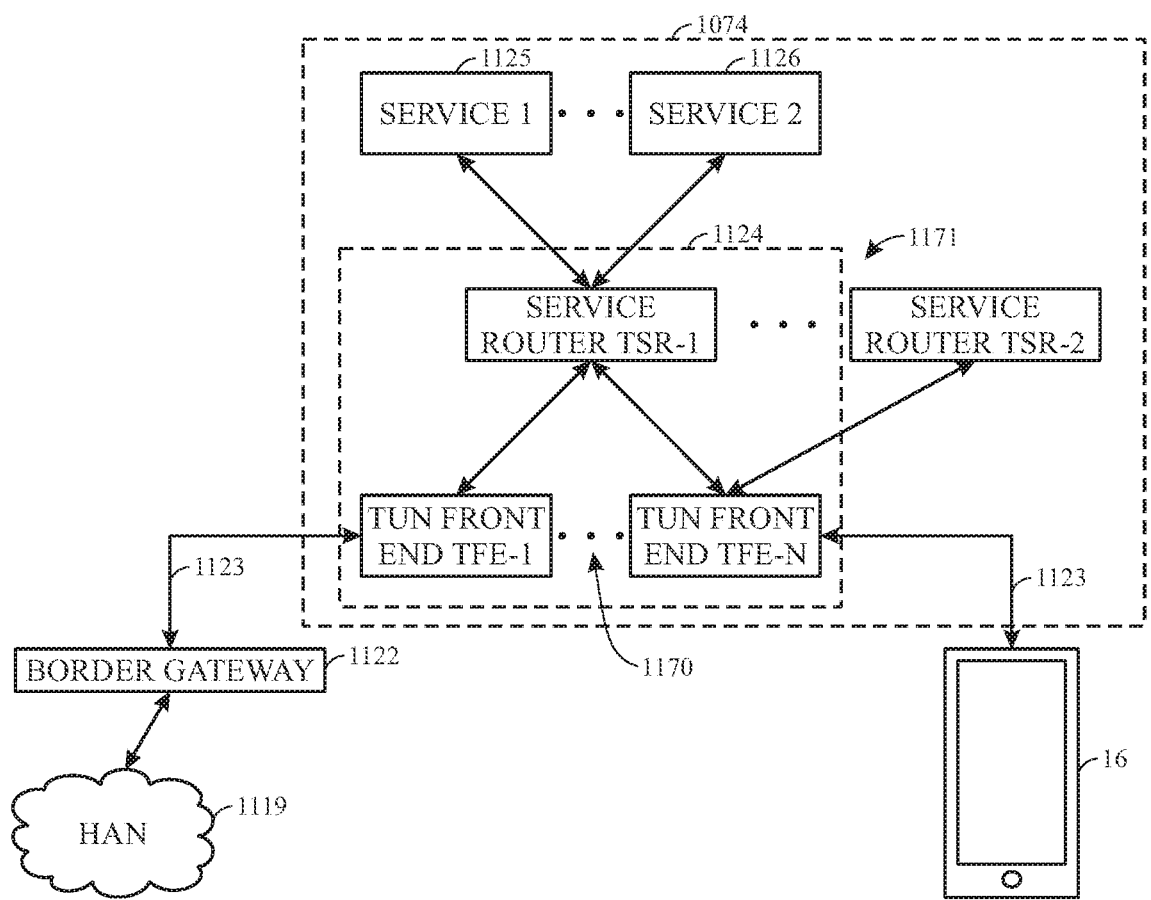
FIG. 17 illustrates a connection scheme with a two-tier Service Router, in accordance with an embodiment.

As illustrated in FIG. 17, the architecture of the service router (SR) would be based on a two-tier model. The lower tier includes of a set of Tunnel FrontEnds (TFE) 1170 and the upper tier includes a set of Tunnel BackEnds service routers (TSR) 1171. The border gateway devices 1122 and mobile devices 66 would be connecting to the Tunnel FrontEnds 1170 based on DNS resolution, load balancing, and/or geographical proximity factors. However, the Tunnel Backend Routers 1171 are selected for a specific fabric ID based on a consistent hashing technique so that each fabric ID maps consistently to the same Tunnel BackEnd Router 1171.

The TFE 1170 has a connection to the SR 1124 as the main backend routing server. In some embodiments, the TFE 1170 would be capable of connecting to multiple SRs 1124 allowing a user to communicate with, not only a device or service in his/her fabric, but also, as a guest, to a different fabric for which he/she has shared privileges. The overall working principle of the service routers would be to receive a packet on some tunnel interface, and look into the destination address and perform a lookup using a route table to find the outgoing tunnel interface to send the packet through the indicated tunnel.

e. Addressing

In order for the IPv6 addressing to work properly, the addressing mechanism may be modeled according to IPv6 addresses so that a router forwarding the packet can determine the correct destination. For example, the following assignments may be used in composing IPv6 addresses within the scope of routing within the service tunnel.

The service 1074 would, typically, have a specific subnet Id (e.g., "S") associated to it. This would serve as the subnet ID for all endpoints in the service 1074. Each service endpoint would have a unique virtual service endpoint Node ID. Using this Node ID, it would compute a virtual IPv6 address for its representation within each fabric. For example, for a service endpoint with Node ID N, and for a Fabric ID<i> mapped to a 40 bit Global ID Gi, the service endpoint address would be fd<Gi>:<S>::<N>/128. Similarly, all mobile devices would also have a separate unique subnet ID associated with their ULA address (e.g., "M"). For example, a mobile node's address with a Node ID X within the same fabric would be fd<Gi>:<M>::<X>/128.

Specific routes may be used at the service routers relevant to each connected border gateway device 1122 belonging to a specific fabric (with Global ID Gi) fd<G1>:1::/64->TID1 and fd<G1>:2::/64->TID1, where, 1 and 2 are subnet IDs for 802.15.4 and WiFi, respectively and TID1 identifies the tunnel ID (Connection socket) of the tunnel for the border gateway in fabric with Global ID G1. The service router listens to messages on all the tunnel IDs. The SR analyzes the destination address of the IPv6 packet, after decapsulation and/or decryption. If the destination address has a subnet id of the service, the SR sends the packet down the tunnel interface leading to the service endpoints.

Whenever, the mobile application for the same fabric connects and creates a tunnel, a route entry would be added in the service route table for the mobile (e.g., transient) device. For example, the route entry may be fd<G1>:<M1>::<Mobile-Node-Id1>/128->Mobile TID1.

During parsing and lookup of destination IP for data packet delivery, if the subnet ID is the mobile subnet Id, then the SR looks up the application route table for the mobile tunnel connection and sends the packet down that path. Otherwise, the SR queues the packet (for a small grace period) for delivery when the transient device connects.

f. Tunneling Protocol

This section delineates the design of the tunneling protocol between the border gateway and mobile devices as clients and the service router as the server. The tunnel establishment is initiated by the client devices with the service router. There is an initial phase of authentication and establishment of trust before the session keys are generated to encrypt subsequent communication, such as a Certificate Authenticated Session Establishment (CASE) protocol or Password Authenticated Session Establishment (PASE) protocol as taught in U.S. patent application Ser. No. 14/508,933, titled "Authenticated Session Establishment," which was filed on Oct. 7, 2014, and which is incorporated by reference in its entirety. The tunneling protocol includes two sub protocols: the control protocol and the data protocol.

i. Tunnel Control Protocol

The primary goal of the Tunnel Control Protocol would be to function as a route distribution protocol and send downstream route updates to upstream nodes so that the upstream nodes can install these routes. Moreover, the control protocol also ensures that the routes stay fresh and works to make sure any stale routes are removed and the table updated.

A routing information keeper is used in the service 1074 to get a list of the currently active backend routers and consistent hashing technique is used to compute mappings between fabric IDs and tunnel backend routers.

Using the information from routing information keeper, the tunnel control nodes in the service 1074 maintain a set of fresh and accurate routes for each fabric that is active. When the Border gateway is sending a Route Update message, it specifies all routes for the corresponding fabric IDs. The routes may have prefixes of a first length (e.g., 64). When the transient device is sending a Route Update message, it specifies all routes for the set of fabric IDs that it is subscribed to. The routes would be host routes having a second length (e.g., 128).

The Tunnel Control Protocol is divided into two parts; an edge control protocol between the border gateways/mobile devices and the Tunnel FrontEnd Node in the service 1074, and a core control protocol between the Tunnel FrontEnd and the Tunnel Backend router.

1. Edge Control Protocol

The Edge Control Protocol operates between the border gateways/mobile phones and the Tunnel FrontEnds to establish the Route entries for the corresponding fabric. The Edge Control protocol includes a Tunnel Open Message, Tunnel Open Acknowledgment Message, Tunnel Route Update Message, Tunnel Route Update Acknowledgment Message, Tunnel Close Message, Tunnel Close Acknowledgment Message, Tunnel Reconnect Message, and Tunnel Reconnect Acknowledgment Message.

The Tunnel Open Message is the indication by the sender to create a tunnel. The recipient of this message sets up the necessary handlers to qualify this connection as one which handles tunneled messages. Additionally or alternatively, this message contains the IPv6 routes needed to install routes at the recipient node. The Tunnel Open message may also carry a prefix lists for multiple fabric IDs in the case of a mobile phone which is subscribed to multiple fabrics. The Tunnel Open message includes a fabric ID and a list of IPv6 prefixes.

The Tunnel Route Update message is used for updating the route table at the recipient for that fabric. The Tunnel Route Update message would contain the following as part of its payload includes a Fabric Id and a List of IPv6 routes to be programmed at the recipient node for that Fabric Id to provide the information to the service router for setting up relevant routes at its end. Additionally or alternatively, the Tunnel Route Update message may carry prefix lists for multiple fabric IDs in the case of a mobile phone which is subscribed to multiple fabrics. The Tunnel Route Update message would, effectively, carry an update of the entire route table for that fabric id. This message would be used for both addition or deletion of routes within the routing table.

The Tunnel Route Update Acknowledgment message acknowledges the Route Update message back. This could be the Status Report message as a part of a core profile as taught in U.S. patent application Ser. No. 13/926,302, titled "Fabric Network," which was filed on Jun. 25, 2013, and which is incorporated by reference in its entirety.

The Tunnel Reconnect message is a message by which the Tunnel FrontEnd lets the border gateway/mobile know that the latter needs to reconnect back to the Tunnel Front End as the former connection would not be available. This message prompts the border gateway/mobile to lookup the name of the Tunnel FrontEnd and then connect to it afresh. The Tunnel Close Message is used to close the tunnel connection. If the connection to the Tunnel FrontEnd is lost, the border gateway or the transient device would immediately try to reconnect back and send a Route Update message to update stale routes at the Tunnel FrontEnd.

2. Core Control Protocol

The Core Control Protocol operates between the Tunnel FrontEnd nodes and the Tunnel Backend Router nodes. The Core Control Protocol includes a Tunnel Open Message, Tunnel Open Acknowledgment Message, Tunnel Route Update Message, Tunnel Route Update Acknowledgment Message, Tunnel Reconfigure Message, Tunnel Reconfigure Acknowledgment Message, Tunnel Close Message, and Tunnel Close Acknowledgment Message.

Semantically, the Tunnel Open, Route Update, Reconfigure, and Tunnel Close messages are similar to the ones in the Edge Control Protocol, but the messages may be different but analogous in function. The Tunnel Route Update message contains a list of prefixes for the set of fabric IDs that are mapped to the particular Tunnel Backend Router to which this message is destined for.

The Tunnel Reconfigure message is sent by the Tunnel Backend Router to the Tunnel FrontEnd to indicate that it is not the correct Backend Router for one or more routes in the Route update message. This message acts as a trigger for the Tunnel FrontEnd to update its list of active Tunnel BackEnd routers and remap the fabric IDs to them and subsequently, send Route Update messages to the appropriate Tunnel BackEnd Routers. This message could also be triggered at the Tunnel Backend Router by the receipt of a regular Tunneled data message if the data message is not destined for that Tunnel Backend Router. The behavior in that scenario would be to send the Tunnel Reconfigure to the Tunnel FrontEnd and also echo the Tunneled data message back. The Tunnel FrontEnd would then queue the returned data message until it has resolved the fabric to Tunnel BackEnd mapping before dispatching the data message to the correct Tunnel BackEnd Router.

The tunneling service running on the cloud would use the same port and reuse the same TCP connection that a device uses currently to communicate with the service 1074. In some embodiments, the control messages for setting up the tunnel would be sent over the communication protocol as a new profile called the Tunnel Control Profile on top of other profiles, such as those taught in U.S. patent application Ser. No. 13/926,302, titled "Fabric Network," which was filed on Jun. 25, 2013.

ii. General Message Format

The tunneled data messages carry the original IPv6 packet between the border gateway and Service Endpoints or mobile devices. The IPv6 packet would be carried as payload within a Tunnel packet.

Figure 18:
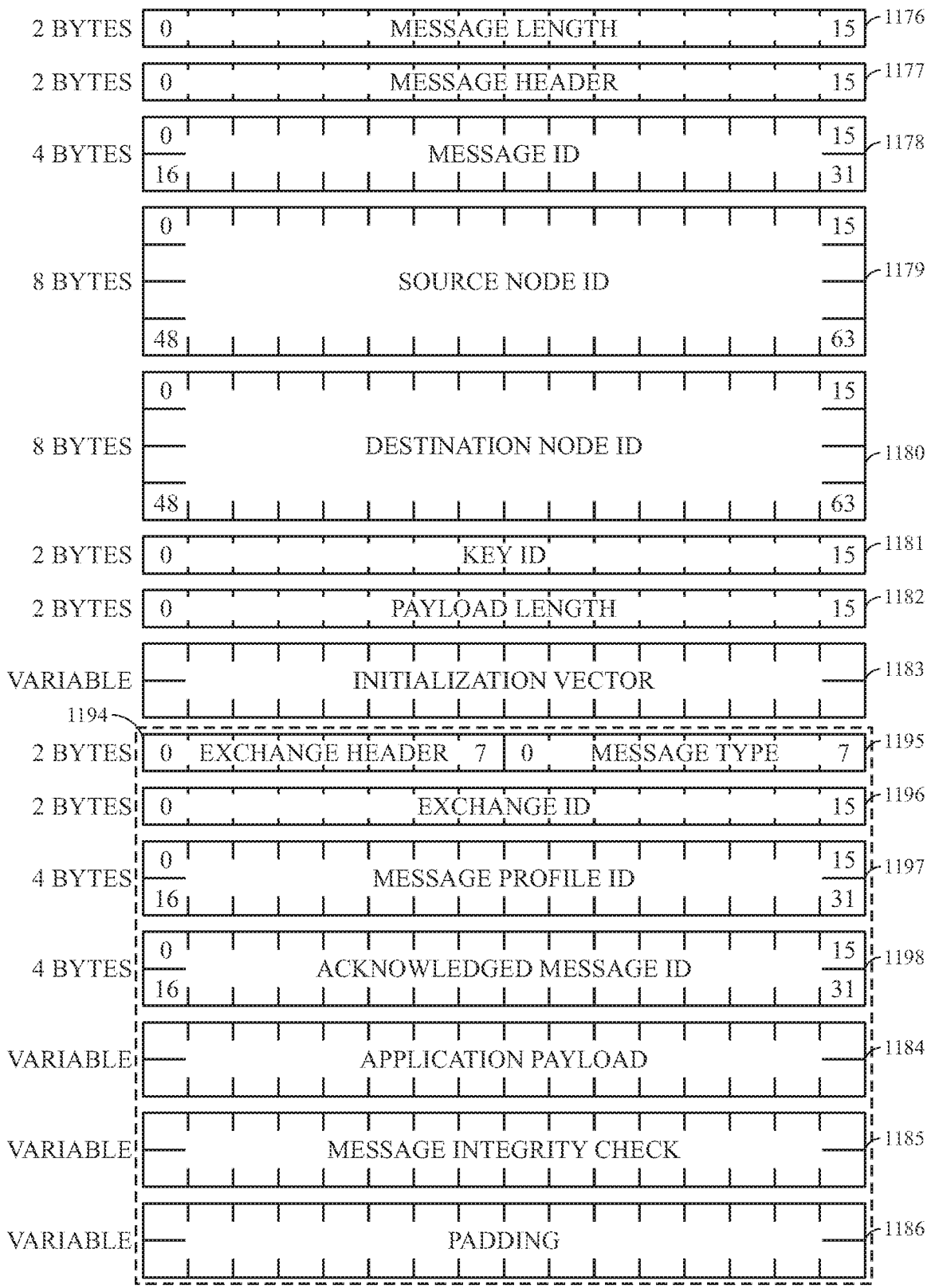
FIG. 18 illustrates a general message protocol (GMP) that may be used to transmit data over the fabric network, in accordance with an embodiment.

Using one of the profiles, data may be transmitted within the fabric (locally and remotely) using a general message protocol that may incorporate TLV formatting. An embodiment of a general message protocol (GMP) 1175 is illustrated in FIG. 18. In certain embodiments, the general message protocol (GMP) 1175 may be used to transmit data within the fabric. The GMP 1175 may be used to transmit data via connectionless protocols (e.g., UDP) and/or connection-oriented protocols (e.g., TCP). Accordingly, the GMP 1175 may flexibly accommodate information that is used in one protocol while ignoring such information when using another protocol. Moreover, the GMP 1175 may enable omission of fields that are not used in a specific transmission. Data that may be omitted from one or more GMP 1175 transfers is generally indicated using grey borders around the data units. In some embodiments, the multi-byte integer fields may be transmitted in a little-endian order or a big-endian order.

i. Message Length

In some embodiments, the GMP 1175 may include a Message Length field 1176. In some embodiments, the Message Length field 1176 includes 2 bytes. A value in the Message Length field 1176 corresponds to an unsigned integer indicating an overall length of the message in bytes, excluding the Message Length field 1176 itself. In some embodiments, the Message Length field 1176 may be present when the GMP 1175 is transmitted over a TCP connection, but when the GMP 1175 is transmitted over a UDP connection, the message length may be equal to the payload length of the underlying UDP packet obviating the Message length field 1176.

ii. Message Header

Figure 19:
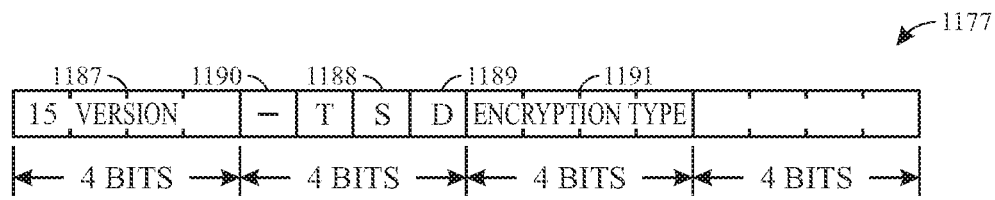
FIG. 19 illustrates a message header field of the GMP of FIG. 18, in accordance with an embodiment.

The GMP 1175 may also include a Message Header 1177 regardless of whether the GMP 1175 is transmitted using TCP or UDP connections. In some embodiments, the Message Header 1177 includes two bytes of data arranged in the format illustrated in FIG. 19. As illustrated in FIG. 19, the Message Header 1177 includes a Version field 1187. The Version field 1187 corresponds to a version of the GMP 1175 that is used to encode the message. Accordingly, as the GMP 1175 is updated, new versions of the GMP 1175 may be created, but each device in a fabric may be able to receive a data packet in any version of GMP 1175 known to the device. In addition to the Version field 1187, the Message Header 1177 may include an S flag field 1188, a D Flag 1189, and a T Flag 1190. The S Flag 1188 is a single bit that indicates whether a Source Node Id (discussed below) field is included in the transmitted packet. Similarly, the D Flag 1189 is a single bit that indicates whether a Destination Node Id (discussed below) field is included in the transmitted packet. The T Flag 1190 indicates whether the message contains a tunneled IP packet. For example, the value of the T Flag 1190 may be a default value (e.g., 0) if the Version subfield in the Message Header has a value corresponding to versions that do not include tunneled messages. For general messages this field will have a first value (e.g., 0) while tunneled messages have a different value (e.g., 1).

The Message Header 1132 also includes an Encryption Type field 1172. The Encryption Type field 1172 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

iii. Message Id

Returning to FIG. 18, the GMP 1175 also includes a Message Id field 1178 that may be included in a transmitted message regardless of whether the message is sent using TCP or UDP. The Message Id field 1178 includes four bytes that correspond to an unsigned integer value that uniquely identifies the message from the perspective of the sending node. In some embodiments, nodes may assign increasing Message Id 1178 values to each message that they send returning to zero after reaching $2^{32}$ messages.

iv. Source Node Id

In certain embodiments, the GMP 1175 may also include a Source Node Id field 1179 that includes eight bytes. As discussed above, the Source Node Id field 1179 may be present in a message when the single-bit S Flag 1188 in the Message Header 1177 is set to 1. In some embodiments, the Source Node Id field 1179 may contain the Interface ID of the ULA In some embodiments, the bytes of the Source Node Id field 1179 are transmitted in an ascending index-value order (e.g., EUI[0] then EUI[1] then EUI[2] then EUI[3], etc.).

v. Destination Node Id

The GMP 1175 may include a Destination Node Id field 1180 that includes eight bytes. The Destination Node Id field 1180 is similar to the Source Node Id field 1179, but the Destination Node Id field 1180 corresponds to a destination node for the message. The Destination Node Id field 1180 may be present in a message when the single-bit D Flag 1189 in the Message Header 1177 is set to 1. Also similar to the Source Node Id field 1179, in some embodiments, bytes of the Destination Node Id field 1180 may be transmitted in an ascending index-value order (e.g., EUI[0] then EUI[1] then EUI[2] then EUI[3], etc.).

vi. Key Id

In some embodiments, the GMP 1175 may include a Key Id field 1181. In certain embodiments, the Key Id field 1181 includes two bytes. The Key Id field 1181 includes an unsigned integer value that identifies the encryption/message integrity keys used to encrypt the message. The presence of the Key Id field 1181 may be determined by the value of Encryption Type field 1191 of the Message Header 1177. For example, in some embodiments, when the value for the Encryption Type field 1191 of the Message Header 1177 is 0x0, the Key Id field 1181 may be omitted from the message.

Figure 20:
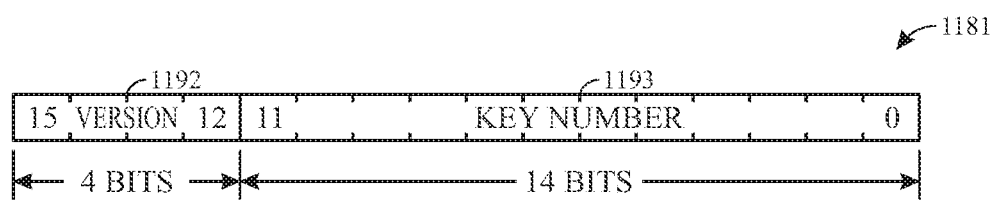
FIG. 20 illustrates a key identifier field of the GMP of FIG. 18, in accordance with an embodiment.

An embodiment of the Key Id field 1181 is presented in FIG. 20. In the illustrated embodiment, the Key Id field 1181 includes a Key type field 1192 and a Key Number field 1193. In some embodiments, the Key type field 1192 includes four bits. The Key type field 1192 corresponds to an unsigned integer value that identifies a type of encryption/message integrity used to encrypt the message. For example, in some embodiments, if the Key type field 1192 is 0x0, the fabric key is shared by all or most of the nodes in the fabric. However, if the Key type field 1192 is 0x1, the fabric key is shared by a pair of nodes in the fabric.

The Key Id field 1181 also includes a Key Number field 1193 that includes twelve bits that correspond to an unsigned integer value that identifies a particular key used to encrypt the message out of a set of available keys, either shared or fabric keys.

vii. Payload Length

In some embodiments, the GMP 1175 may include a Payload Length field 1182. The Payload Length field 1182, when present, may include two bytes. The Payload Length field 1182 corresponds to an unsigned integer value that indicates a size in bytes of the Application Payload field. The Payload Length field 1182 may be present when the message is encrypted using an algorithm that uses message padding, as described below in relation to the Padding field.

viii. Initialization Vector

In some embodiments, the GMP 1175 may also include an Initialization Vector (IV) field 1183. The IV field 1183, when present, includes a variable number of bytes of data. The IV field 1183 contains cryptographic IV values used to encrypt the message. The IV field 1183 may be used when the message is encrypted with an algorithm that uses an IV and omitted from messages that are encrypted using algorithms that do not use an IV. The length of the IV field 1183 may be derived by the type of encryption used to encrypt the message.

ix. Application Payload

The GMP 1175 includes an Application Payload field 1184. The Application Payload field 1184 includes a variable number of bytes. The Application Payload field 1184 includes application data conveyed in the message. The length of the Application Payload field 1184 may be determined from the Payload Length field 1182, when present. If the Payload Length field 1182 is not present, the length of the Application Payload field 1184 may be determined by subtracting the length of all other fields from the overall length of the message and/or data values included within the Application Payload 1184 (e.g., TLV).

The Application Payload field 1184 may include a Profile Identifier ("Id") field. The Profile Id indicates a "theme of discussion" used to indicate what type of communication occurs in the message. The Profile Id may correspond to one or more profiles that a device may be capable of communicating. For example, the Profile Id may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile.

In some embodiments, an indication of the Profile Id may provide sufficient information to provide a schema for data transmitted for the profile. However, in some embodiments, additional information may be used to determine further guidance for decoding the Application Payload field 1184. In such embodiments, the Application Payload field 1184 may include a Profile-Specific Header field. Some profiles may not use the Profile-Specific Header field thereby enabling the Application Payload field 1184 to omit the Profile-Specific Header field. Upon determination of a schema from the Profile Id field and/or the Profile-Specific Header field, data may be encoded/decoded in an Application Payload sub-field. The Application Payload sub-field includes the core application data to be transmitted between devices and/or services to be stored, rebroadcast, and/or acted upon by the receiving device/service. In some embodiments, the Profile Id and/or the Profile-Specific Header information may be included in a field outside of the Application Payload field 1184.

x. Message Integrity Check

In some embodiments, the GMP 1175 may also include a Message Integrity Check (MIC) field 1185. The MIC field 1185, when present, includes a variable length of bytes of data containing a MIC for the message. The length and byte order of the field depends upon the integrity check algorithm in use. For example, if the message is checked for message integrity using HMAC-SHA-1, the MIC field 1185 includes twenty bytes in big-endian order. Furthermore, the presence of the MIC field 1185 may be determined by whether the Encryption Type field 1191 of the Message Header 1177 includes any value other than 0x0.

xi. Padding

The GMP 1175 may also include a Padding field 1186. The Padding field 1186, when present, includes a sequence of bytes representing a cryptographic padding added to the message to make the encrypted portion of the message evenly divisible by the encryption block size. The presence of the Padding field 1186 may be determined by whether the type of encryption algorithm (e.g., block ciphers in cipher-block chaining mode) indicated by the Encryption Type field 1191 in the Message Header 1177 uses cryptographic padding.

xii. Exchange Header

Figure 21:
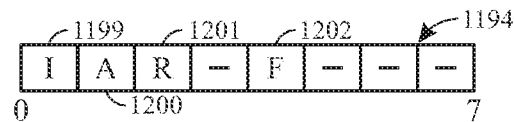
FIG. 21 illustrates a Message Header field of the GMP of FIG. 18, in accordance with an embodiment.

In some embodiments, the GMP 1175 also includes an Exchange Header 1194. FIG. 21 illustrates an embodiment of the Exchange Header 1194. The Exchange Header 1194 includes an Initiator Flag 1199 that indicates that the message sent was sent by the initiator of the exchange. The Exchange Header 1194 also includes an Acknowledgment Flag 1200 that indicates whether the message serves as an acknowledgment of a previous message received by the device currently sending the message. If the Acknowledgment Flag 1200 is set to true, the GMP 1175 may also include an Acknowledged Message Identifier discussed below. The Exchange Header 1194 also includes an Acknowledgment Request Flag 1201 that indicates whether the message should invoke an acknowledgment when received by a target device. The Exchange Header 1194 also includes a Compatibility Field 1202 that indicates compatibility with older protocol versions.

xiii. Message Type

In some embodiments, the GMP 1175 also includes a Message Type 1195 that indicates the type of message (e.g., status report, subscribe request, etc.). In some embodiments, this Message Type 1195 may be interpreted relative to an identified profile identified in the message. The Message Type indicates whether the message is a Tunnel Open Message, Tunnel Open Acknowledgment Message, Tunnel Route Update Message, Tunnel Route Update Acknowledgment Message, Tunnel Close Message, Tunnel Close Acknowledgment Message, Tunnel Reconnect Message, Tunnel Reconnect Acknowledgment Message, Tunnel Reconfigure Message, and Tunnel Reconfigure Acknowledgment Message depending on what profile is indicated in the message.

xiv. Message Profile ID

The GMP 1175 may also include a Message Profile Identifier (ID) field 1197 that indicates a profile (e.g., Core, Data Transfer, etc.) for the message through which the Message Type field 1195 may be interpreted. In some embodiments, the Message Profile ID field 1197 may include 4 bytes. For example, the profile may indicate that the Tunnel Control Protocol as the Edge Control Protocol or the Core Control Protocol is selected as the current message's profile, and that the message should be interpreted according to the Tunnel Control Protocol.

xv. Acknowledged Message ID

The GMP 1175 may also include an Acknowledged Message Identifier (ID) field 1198 that includes an unsigned integer value that contains the message identifier of a previous message that is being acknowledged by the current message. The Acknowledgment Flag 1200 indicates whether the current message is an acknowledgment of a previous message. Therefore, in some embodiments, when the Acknowledgment Flag 1200 is set to false, the Acknowledged Message ID 1198 may be omitted from the message and/or the version of the message format is compatible with an Acknowledged Message ID field 1198. In certain embodiments, when the Acknowledged Message ID 1198 is included in the message, the Acknowledged Message ID 1198 may include 4 bytes.

xvi. Encryption

The Application Payload field 1184, the MIC field 1185, the Padding field 1186 together form an Encryption block. The Encryption block includes the portions of the message that are encrypted when the Encryption Type field 1191 in the Message Header 1177 is any value other than 0x0.

xvii. Message Signature

In some embodiments, the GMP 1175 may also include a Message Signature field. The Message Signature field, when present, includes a sequence of bytes of variable length that contains a cryptographic signature of the message. The length and the contents of the Message Signature field may be determined according to the type of signature algorithm in use and indicated elsewhere in the message. For example, if ECDSA using the Prime256v1 elliptical curve parameters is the algorithm in use, the Message Signature field may include two thirty-two bit integers encoded in little-endian order.

iii. Tunneled Data Transfer Protocol

The weave tunnel header may include only a portion of the fields of the GMP 1175. For example, the message protocol may include message type flag bits set to identify the message as a tunneled data message, distinguishing it from other message types.

Moreover, the Tunneled data message may contain only a portion of the fields of the message protocol. For example, the tunneled data message may include the length field, the message header field with a special message type in the header indicating a tunneled message, the version field, the metadata length field, the metadata field (i.e., fabric ID), and the packet payload while omitting one or more others. The length field, the message header field, the Version field, the metadata length field, and the metadata field are all part of the Tunnel Header portion of the message.

In other words, messages containing tunneled IP packets have a similar format to general messages. For fields that are shared between the two formats, the structure and interpretation of the fields is the same as described for the general message format. Similarly, the process by which messages are encrypted and integrity checked may also the same, albeit with different inputs to the encryption/integrity process.

A tunneled IP message is distinguished from a general Weave message by the value of the T Flag subfield 1161 within the message header, which for all tunneled IP messages is set to true. The Packet Data field within tunneled IP message contains the encoded IP packet, with the first byte of the field containing the first byte of the packet's IP header. The length of the Packet Data field correspond exactly to the length of the contained packet, as encoded in its header.

The Packet Data field can contain either an IPv4 packet or an IPv6 packet. The type of packet is distinguished by the IP version field encoded in the initial byte of the IP header. The contained packet can convey any valid IP protocol including UDP, TCP, ICMP, etc.

Furthermore, the contents of the contained IP packet have no bearing on the format or addressing of the tunneled IP message that conveys it. In particular, the Source and Destination Node Id fields of a tunneled IP Weave message convey the node ids of the tunneling agents that are exchanging the tunneled IP message and may be unrelated to the source and destination IP addresses contained in the IP packet.

Similarly, in the case where the contained IP message is itself conveying another message, the structure, encoding and encryption of the inner message has no bearing on that of the outer tunneled IP message. This implies, among other things, that a tunneled IP message that is encrypted using a particular set of encryption keys, can convey a IP packet containing another message that is encrypted using an entirely different set of keys.

iv. Tunnel Setup

Figure 22:
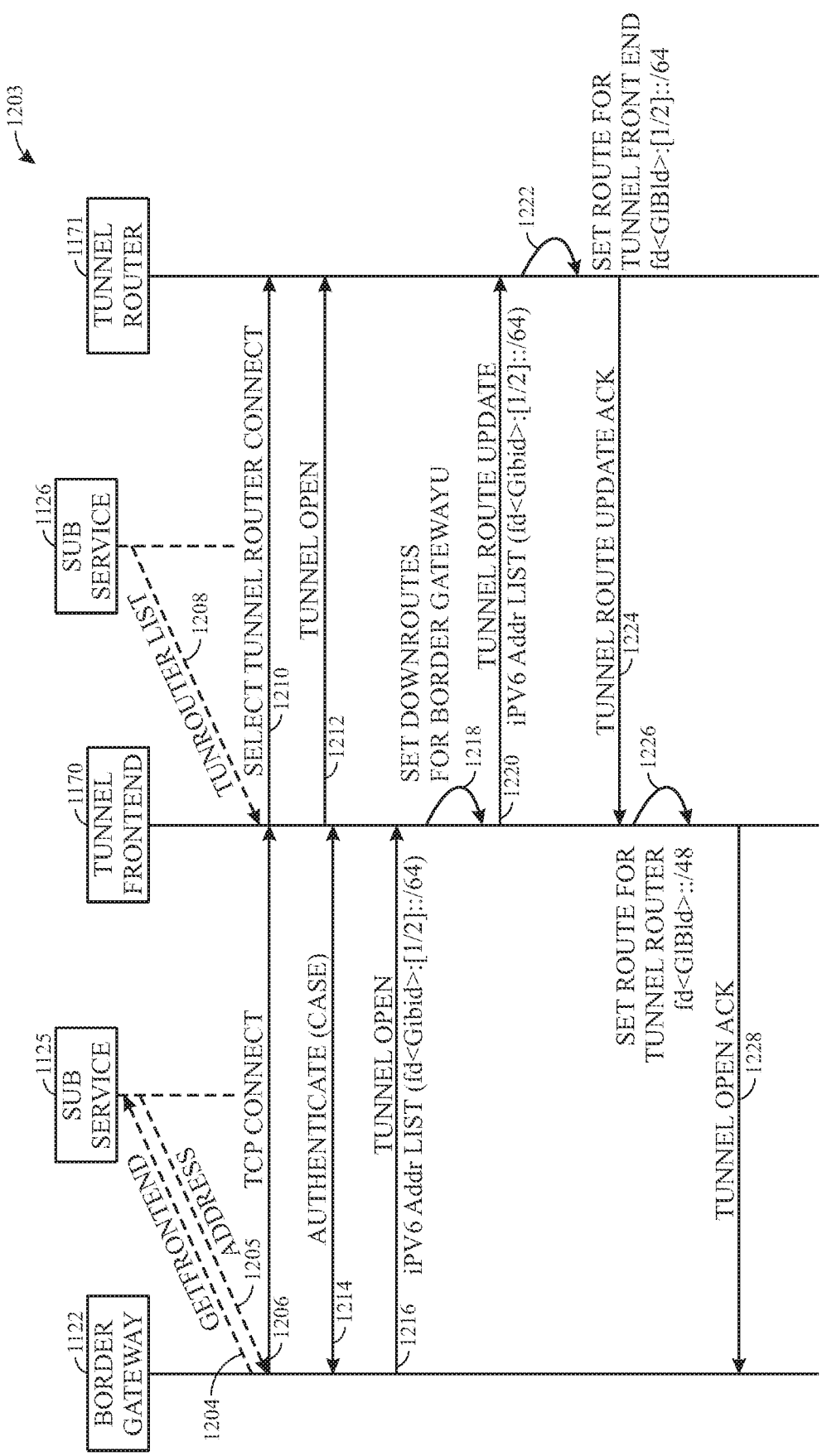
FIG. 22 illustrates a messaging diagram for establishing a tunnel via a border gateway device, in accordance with an embodiment.

FIG. 22 illustrates a messaging diagram 1203 that shows how the Tunnel Control Protocol may be used to establish routes on nodes, Tunnel Front Ends, and Tunnel Routers between a border gateway device 1122 and the Tunnel Router 1171. In some embodiments, at some point, a border gateway device 1122 contacts a service 1074 via a subservice 1125 with a GetFrontEnd request 1204 that requests an address for a Tunnel FrontEnd 1170 of the service through which the border gateway device 1122 may establish a connection. The subservice 1125 responds with an address 1205 for the Tunnel FrontEnd 1170. In other words, the subservice 1125 effectively acts as a directory or point of contact that enables devices to connect to a location to find other locations to enable load balancing and distribution of services within the service 1074. Using the address 1205, the border gateway device 1122 sends a TCP Connect request 1206 to the Tunnel FrontEnd 1170. The border gateway device 1122 selects Tunnel Router 1171 based on a tunnel router list 1208 received from subservice 1126. In some embodiments, the tunnel router list 1208 may be retrieved from the subservice 1125. The Tunnel FrontEnd 1170 then connects 1210 to the selected Tunnel Router 1171. The Tunnel FrontEnd 1170 also sends a Tunnel Open message 1212 to open a tunnel through the Tunnel Router 1171. Moreover, after initial connection between the border gateway device 1122 and the Tunnel FrontEnd 1170, the devices authenticate 1214 with each other. For example, the devices may authenticate using CASE authentication discussed above.

After authenticating with the Tunnel FrontEnd 1170, the border gateway device 1122 sends a Tunnel Open message 1216, as discussed above to begin creation of the tunnel between the border gateway device 1122 and the Tunnel Router 1171. In response to the Tunnel Open message 1216, the Tunnel FrontEnd 1170 sets down routes for the border gateway device 1122, as discussed previously. The Tunnel FrontEnd 1170 then sends a Tunnel Route Update message 1220 to the Tunnel Router 1171 to indicate the tunnel route to the border gateway device 1122. In response to the Tunnel Route Update message 1220, the Tunnel Router 1171 sets the routes for the Tunnel Router 1171. The Tunnel Router 1171 then sends the routes to the Tunnel FrontEnd 1170 in a Tunnel Route Update Acknowledgment message 1224. In response, to the Tunnel Route Update Acknowledgment message 1224, the Tunnel FrontEnd 1170 sets the route for the Tunnel Router 1171 for the tunnel with the border gateway device effectively completing tunnel establishment. In response to establishment, the Tunnel FrontEnd 1170 sends a Tunnel Open Acknowledgment message 1228 to the border gateway device 1122 to confirm establishment to the border gateway device 1122 to indicate to the border gateway device 1122 that the tunnel is open.

Figure 23:
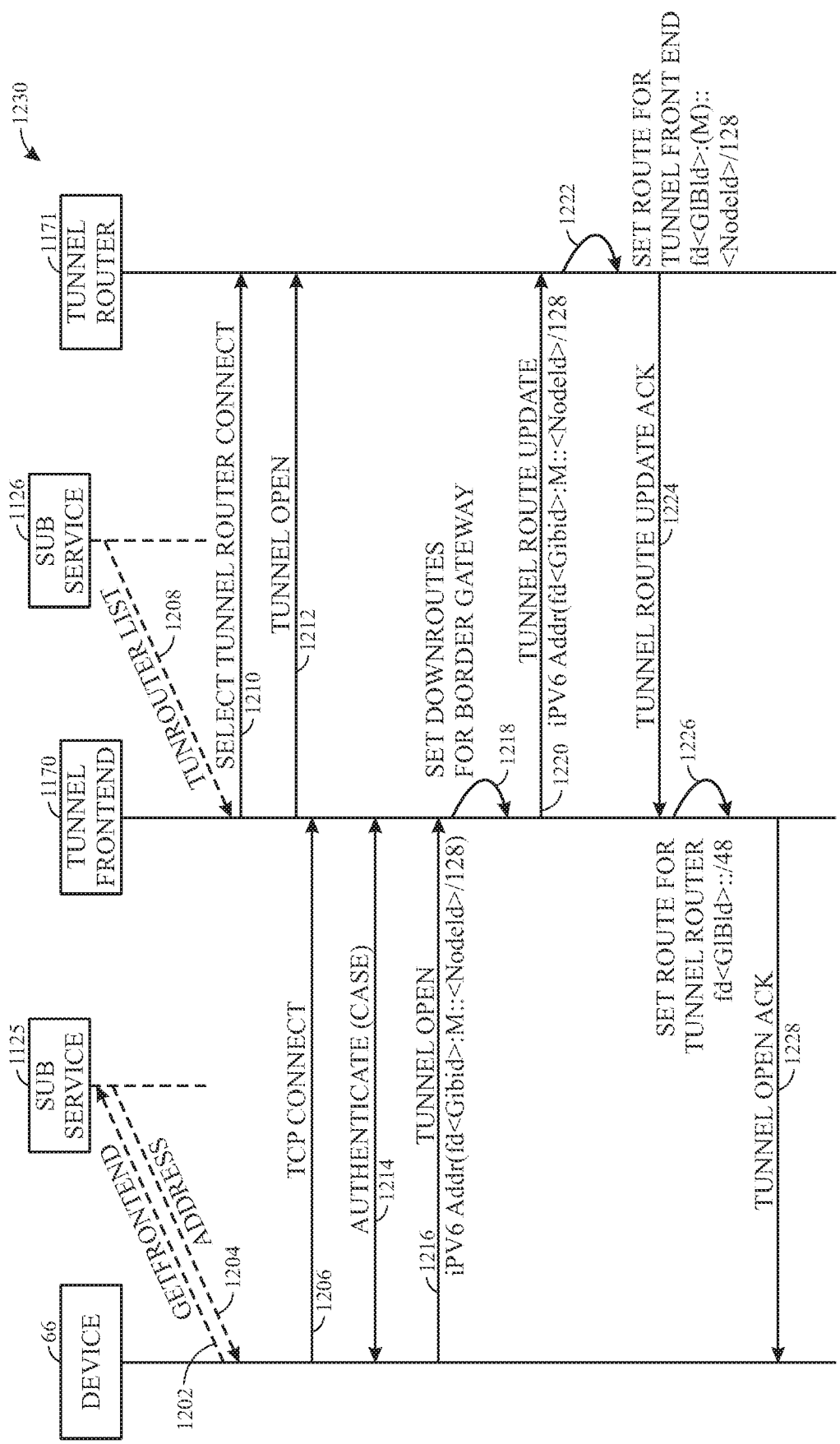
FIG. 23 illustrates a messaging diagram for tunnel establishment from the perspective of a mobile/transient device, in accordance with an embodiment.

FIG. 23 illustrates a messaging diagram 1230 that shows how the Tunnel Control Protocol may be used to establish routes on nodes, Tunnel Front Ends, and Tunnel Routers between a smart device 66 and Tunnel Router 1171. The process for establishing the tunnel to the smart device 66 is similar to that illustrated in FIG. 22. However, the subservices 1125 and/or 1126 may be different subservices based on location of the smart device 66, remote status of the smart device 66, or other factors. Also, notice that the address used for the border gateway device 1122 and the smart device 66 may have different lengths. For example, in some embodiments, the smart device 66 utilizes a longer (e.g., 128 bit address) in the tunnel establishment while the border gateway device 1122 utilizes a shorter address (e.g., 64 bits).

v. Tunnel Modification

Figure 24:
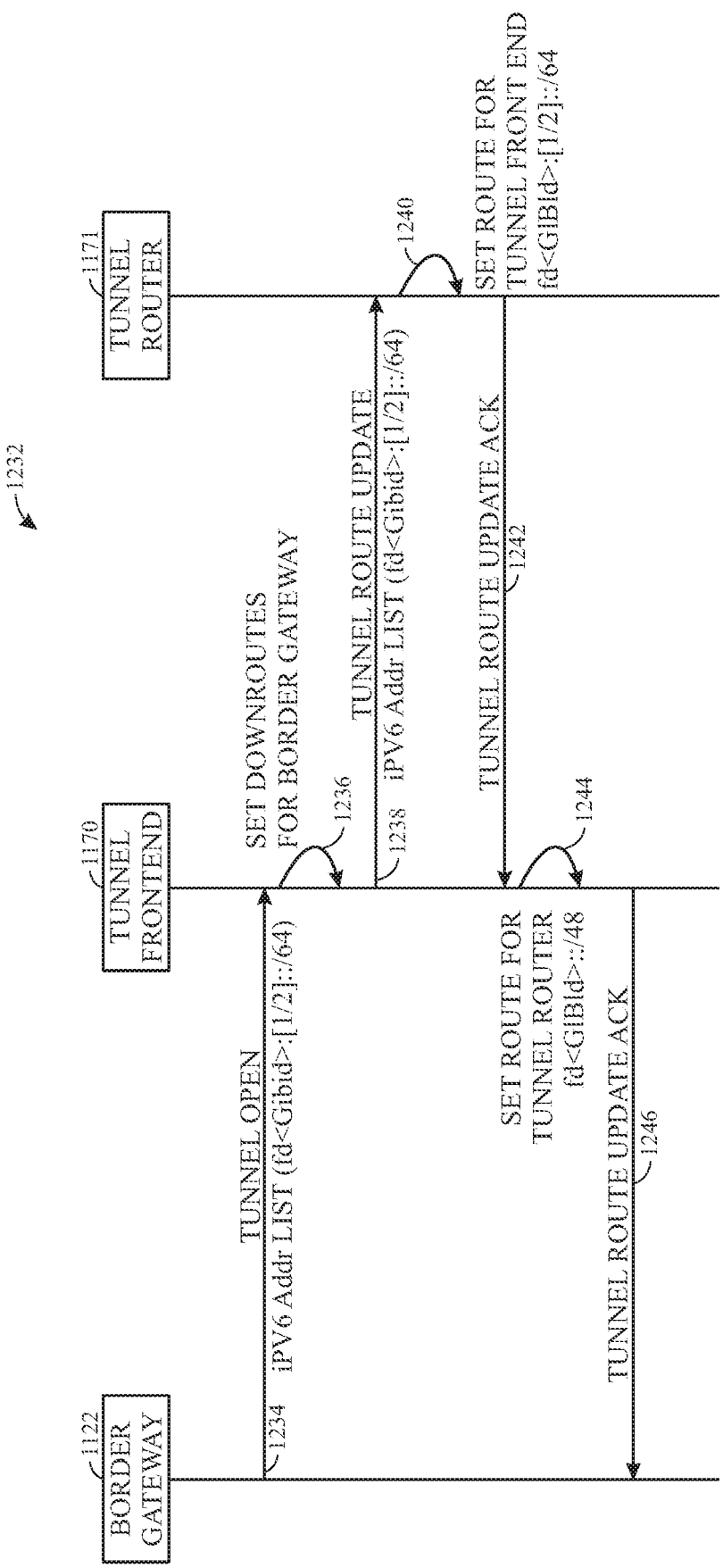
FIG. 24 illustrates a messaging diagram for tunnel modification, in accordance with an embodiment.

Sometimes after establishment of a tunnel, the tunnel should be modified. For example, the tunnel may be rerouted based on load balancing or FIG. 24 illustrates a messaging diagram 1232 that may be used to modify the tunnel connection between the border gateway device 1122 and the Tunnel Router 1171. The border gateway device 1122 sends a Tunnel Route Update message 1234 that causes the Tunnel FrontEnd 1170 to update 1236 the down routes for the border gateway device 1122. After updating the down routes, the Tunnel FrontEnd 1170 sends a Tunnel Route Update message 1238 to the Tunnel Router 1171 to cause the Tunnel Router 1171 to update 1240 routes for the tunnel to the Tunnel FrontEnd 1240. After updating, the Tunnel FrontEnd 1171 sends a Tunnel Route Update Acknowledgment message 1242 to the Tunnel FrontEnd 1171. After receiving the Tunnel Route Update Acknowledgment message 1242, the Tunnel FrontEnd 1171 sets routes 1244 for the Tunnel Router 1171 who sent the acknowledgment. After setting routes to the border gateway device 1122 and the Tunnel Router 1171, the Tunnel FrontEnd 1170 sends a Tunnel Route Update Acknowledgment message 1246 to indicate to the border gateway device 1122 that the route for the tunnel has been updated.

vi. Tunnel Front End Reconnection

Figure 25:
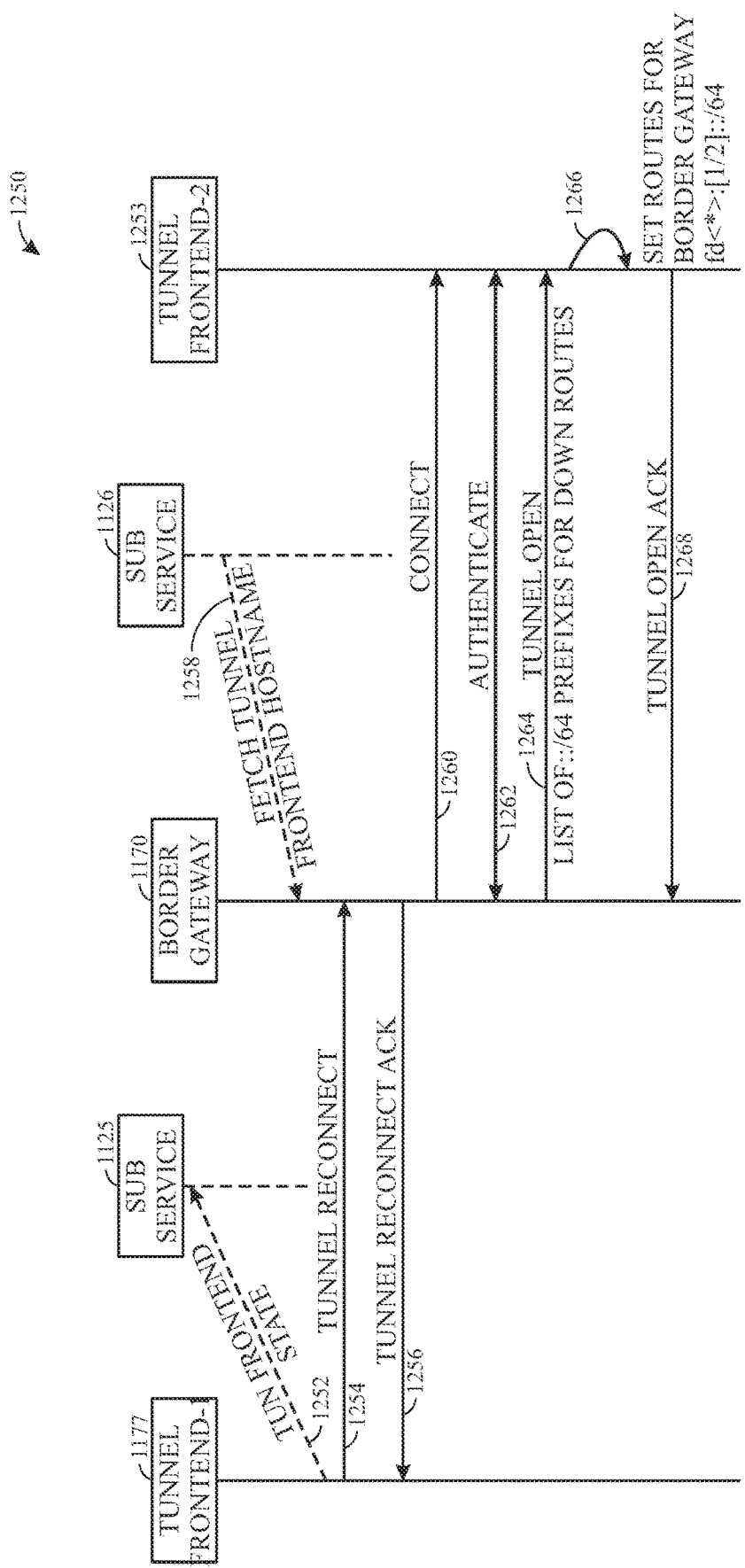
FIG. 25 illustrates a messaging diagram for a tunnel reconnection, in accordance with an embodiment.

In some embodiments, the Tunnel Front End 1171 may be shifted from one FrontEnd to another. For example, the Tunnel FrontEnd 1171 may be a stale node that is about to be decommissioned. FIG. 25 illustrates a messaging diagram 1250 of a Tunnel FrontEnd reconnection. The Tunnel FrontEnd 1177 receives a message 1252 that indicates that the Tunnel FrontEnd 1177 is no longer the correct FrontEnd for the tunnel. In other words, the FrontEnd role may be shifted from FrontEnd 1177 to FrontEnd 1253 for the tunnel to the border gateway device 1122. The Tunnel FrontEnd 1177 then sends a Tunnel Reconnect message 1254 that causes the border gateway device 1122 to close the tunnel and open a new tunnel. The border gateway device 1122 may respond to the Tunnel Reconnect message 1254 with a Tunnel Reconnect Acknowledgment message 1258 to indicate that the border gateway device received the message and will close the tunnel accordingly.

Also, in response to the Tunnel Reconnect message 1254, the border gateway device 1122 obtains a new identification for a Tunnel FrontEnd 1253 for the new connection using a fetch request 1258 effectively starting the open tunnel process over. In embodiments where the border gateway device 1122 sends the Tunnel Reconnect Acknowledgment message 1256, the fetch request 1258 before, after or simultaneous to the Tunnel Reconnect Acknowledgment message 1258. After receiving the address for the Tunnel FrontEnd 1253, the border gateway device 1122 continues the reconnection similar to a new connection by sending a connect message 1260 and authenticating 1262 with the Tunnel FrontEnd 1253. After authentication, the border gateway device 1122 sends a Tunnel Open message 1264 which causes the Tunnel FrontEnd 1253 to set the route 1266 for the border gateway device 1122. Once the Tunnel FrontEnd 1253 has set the route, the Tunnel FrontEnd 1253 sends a Tunnel Open Acknowledgment message 1268 indicating that the tunnel has been opened for transmission of messages.

vii. Tunnel Router Reconfiguration

In the event of a tunnel router being decommissioned or a new tunnel router being added, the load may be uniformly distributed among the active tunnel routers. Additionally or alternatively, the tunnel service router sends a reconfigure message when the receiving tunnel service router is not the correct router. The router sends the Tunnel Reconfigure message to prompt the Tunnel FrontEnd to refresh the list of active Tunnel Service Routers.

Figure 26:
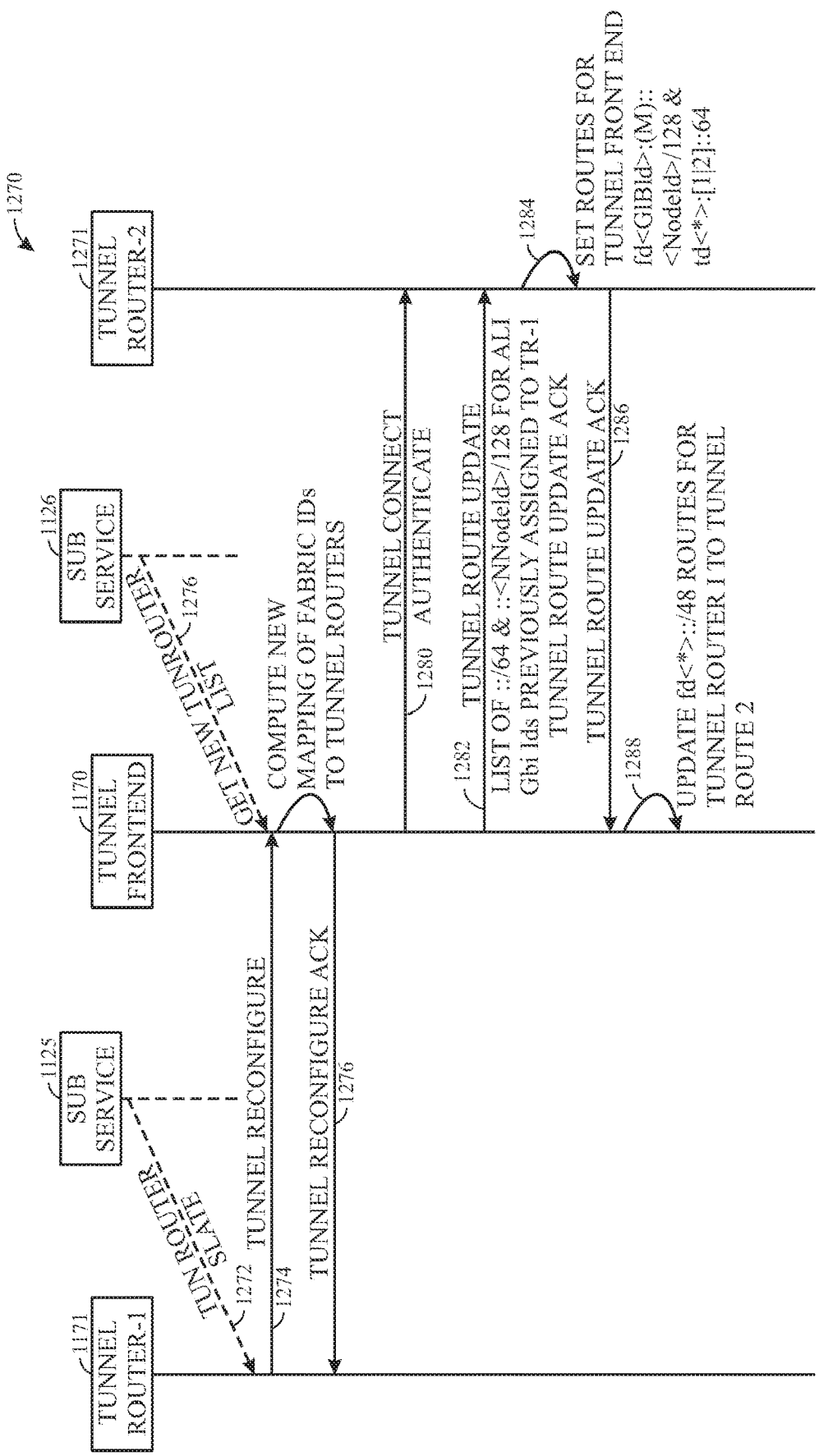
FIG. 26 illustrates a messaging diagram for tunnel reconfiguration, in accordance with an embodiment.

In that regard, a consistent hashing scheme may be used to evaluate a new Tunnel Router after the configuration of the Tunnel Router list has changed. As illustrated in a messaging diagram 1270 of FIG. 26, the tunnel is switched from Tunnel Router 1171 to Tunnel Router 1271. A state message 1272 may be sent to the Tunnel Router 1171 to indicate that the tunnel should be switched to the Tunnel Router 1271. In order for the Tunnel FrontEnd 1170 to know of the switch, the Tunnel Router 1171 sends a Tunnel Reconfigure message 1274 to the Tunnel FrontEnd 1170 that prompt the Tunnel FrontEnd 1170 to fetch the new set of active Tunnel Routers from sub service 1126 using a get router list message 1276.

Upon receiving the new list and regenerating the new fabric-to-TSR mapping, the Tunnel FrontEnd 1170 computes 1278 new mappings for the fabric IDs to Tunnel Routers. Then, the Tunnel FrontEnd 1170 establishes a tunnel connection with the Tunnel Router 1271 using a Tunnel Connect message and authentication 1280 similar to those processes discussed previously. The Tunnel Router 1271 also sends a Route Update message 1282 to the Tunnel Router 1271 to program the new routes at the Tunnel Router 1271.

The tunnel service routers get updates on the active list of Tunnel Routers and if they are not the mapped destination for a specific fabric ID, then all routes pertaining to these fabric IDs are deleted. After getting the new active list of Tunnel Routers, the Tunnel FrontEnd computes the change in fabric mapping and sends Tunnel Route Update messages to only those Tunnel Routers (e.g., Tunnel Router 1271) for which the fabric mapping has changed.

The Tunnel Router 1271 sets routes for the tunnel 1284 based on the Tunnel Route Update message 1282 and returns a Tunnel Router Update Acknowledgment message 1286 that causes the Tunnel FrontEnd 1170 to update routes for Tunnel Router 1171 to Tunnel Router 1271.

B. State Machines

Each component node that participates in the tunneling protocol would be operating within the scope of the protocol state machine. For the purposes of clarity, the protocol state machine for each participant node has been broken into two sub state machines: one for the Route Entry per fabric and another for the Connection states with other nodes.

i. Border Gateway Device State Machines

Figure 27:
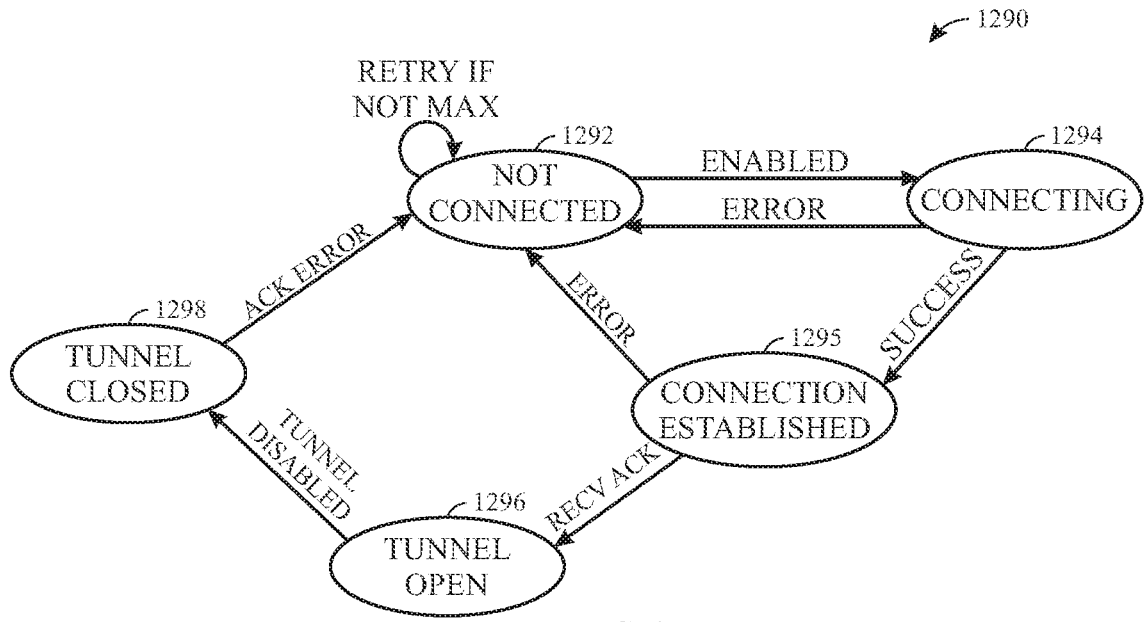
FIG. 27 illustrates a connection state machine of a border gateway device, in accordance with an embodiment.

FIG. 27 illustrates a connection state machine 1290 for the border gateway device 1122 and interactions with the Tunnel FrontEnds in the service 1074 during connection. As noted previously, some devices may use more than one tunnel (e.g., backup and normal tunnel) concurrently. Both the primary and the backup tunnel would execute this state machine steps independently. Some devices may use only a single tunnel. The border gateway device 1122 starts with a not-connected state 1292. Once a tunnel is to be established (or has just dropped connection), tunneling is enabled by causing the border gateway device 1122 enters into a connecting state 1294. While transitioning to the connecting state 1295 a CASE session may be established. The number of attempts to connect may also be tracked at this time using a counter that enables tracking of the number of attempts to prevents excessive attempts.

Upon successful connection, a TunnelOpen control message with route information to set up the tunnel state at the Service and transitions to a Connection Established state 1295. Upon a connection error, the connection switches back to the Not-Connected state 1294. When the number of connection attempts have exceeded a configured maximum, a notification about a tunnel disconnection failure is sent.

In the Connection Established state 1295, upon receiving a successful acknowledgment to the TunnelOpen message, the device enters into a Tunnel-Open state 1298. This is the expected stable state of the tunnel in the steady state. If there is an error response to the TunnelOpen message, the connection is aborted and the FSM moves to the Not-Connected state 1292. Because, if the Tunnel Open fails, it calls into question the validity of the connection itself and it is better to discard the connection and start over.

When the Tunnel retry attempts reach a maximum, an error notification is done and the counter is reset. In some embodiments where Weave tunneling is enabled, as indicated by a member flag TunnEnabled, connection retry attempts may continue relentlessly.

Upon disabling the Tunnel (potentially by the application under various application scenarios when tunneling is not required), the TunnelEnabled flag is set to false, and a TunnelClose control message is sent to the service 1074 to clear its state. Upon receiving a positive acknowledgment, the connection is aborted and the device transitions to the Not-Connected state 1292. If the tunnel is disabled in the Connecting state 1294 or the ConnectionEstablished state 1295, the connection is aborted and the state transitions to the Not-Connected state 1292.

Figure 28:
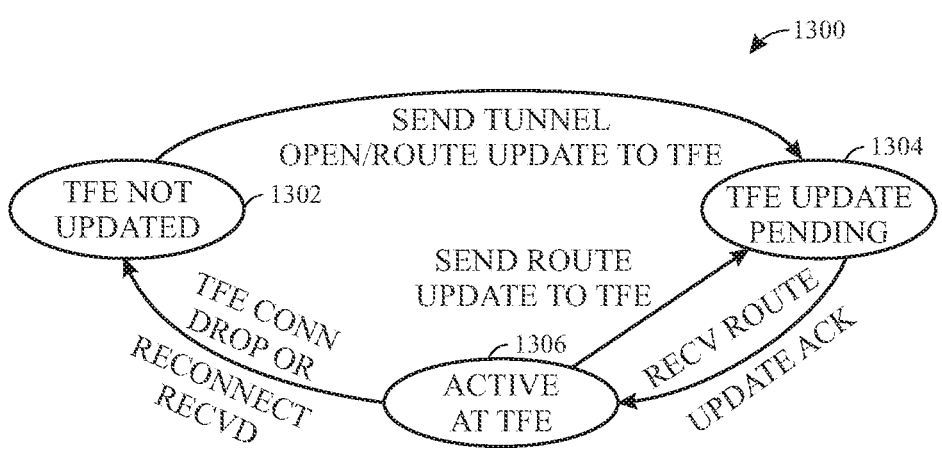
FIG. 28 illustrates a route state machine of the border gateway device of FIG. 27, in accordance with an embodiment.

FIG. 28 illustrates a route state machine 1300 for border gateway device 1122. The border gateway device 1122 has a default no route update state 1302. The border gateway device 1122 sends Tunnel Open message or a Route Update message to a Tunnel FrontEnd that places the border gateway device 1122 in an update pending state 1304. Upon receiving an acknowledgment of the message, the border gateway device 1122 enters into an active tunnel state 1306 with the Tunnel FrontEnd until a disconnection, reconnection message, or a route update. In the case of a disconnection or reconnection message, the border gateway device 1122 reenters the no route update state 1302. In the case of a route update, the border gateway device 1122 reenters the update pending state 1304.

ii. Tunnel FrontEnd State Machine

Figure 29:
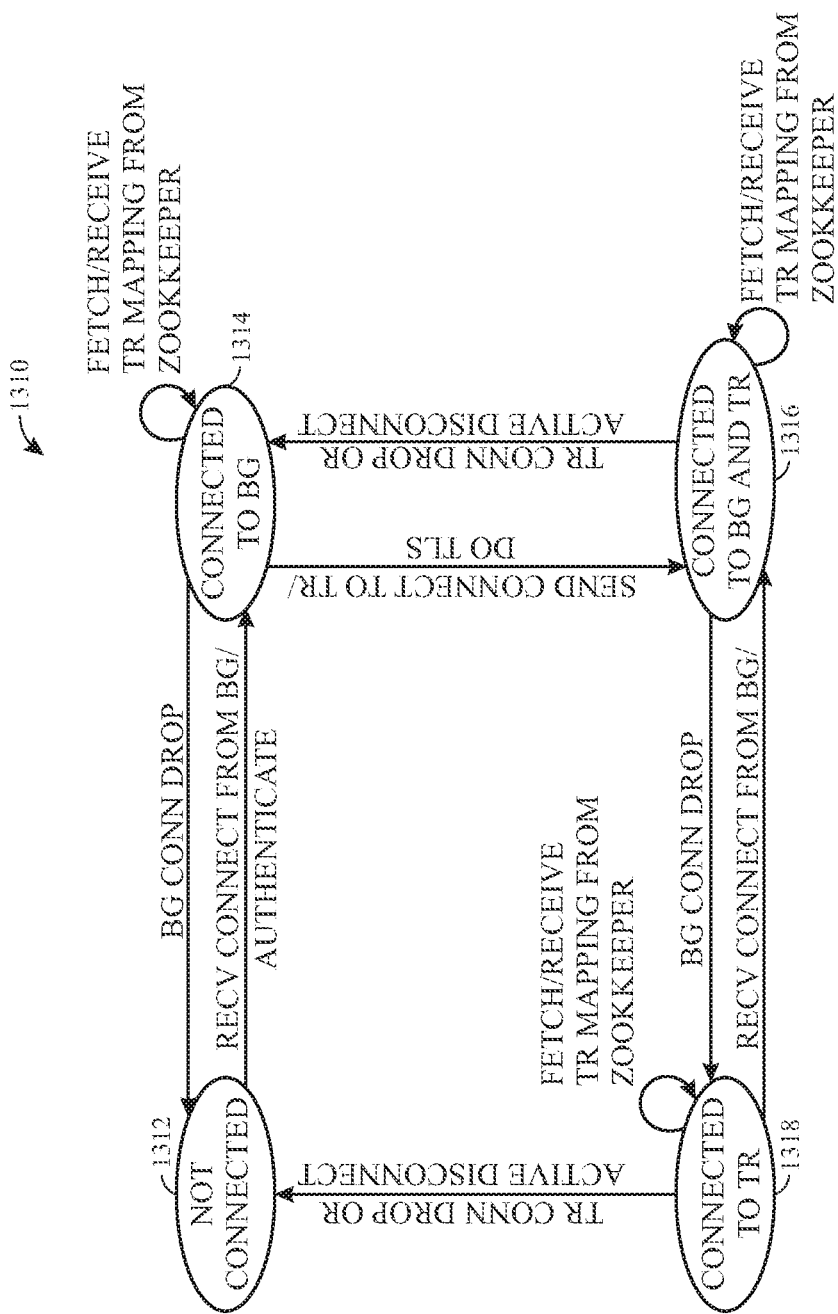
FIG. 29 illustrates a connection state machine of a Tunnel FrontEnd, in accordance with an embodiment.

FIG. 29 illustrates a state machine 1310 for the Tunnel FrontEnd 1170 showing connection states with the border gateway device 1122 and the Tunnel Router 1171. The Tunnel FrontEnd 1170 starts in a disconnected state 1312 where it is not connected to the either the border gateway device 1122 or the Tunnel Router 1171. After receiving a connection request from the border gateway device 1122 and authenticating with the border gateway device 1122, the Tunnel FrontEnd 1170 enters a BG-connected state 1314 in which the Tunnel FrontEnd 1170 attempts to obtain Tunnel Router 1171 mapping. Once the Tunnel FrontEnd 1170 obtains mapping to the Tunnel Router 1171, the Tunnel FrontEnd 1170 connects to the Tunnel Router 1171 and enters the fully connected state 1316 where the tunnel is fully operational. If the border gateway device 1122 loses connection to the Tunnel FrontEnd 1170, the Tunnel FrontEnd 1170 enters into a TR-connected state 1318 where it is connected to the Tunnel Router 1171 but not the border gateway device 1122 while trying to renew connection to the border gateway device 1122.

Figure 30:
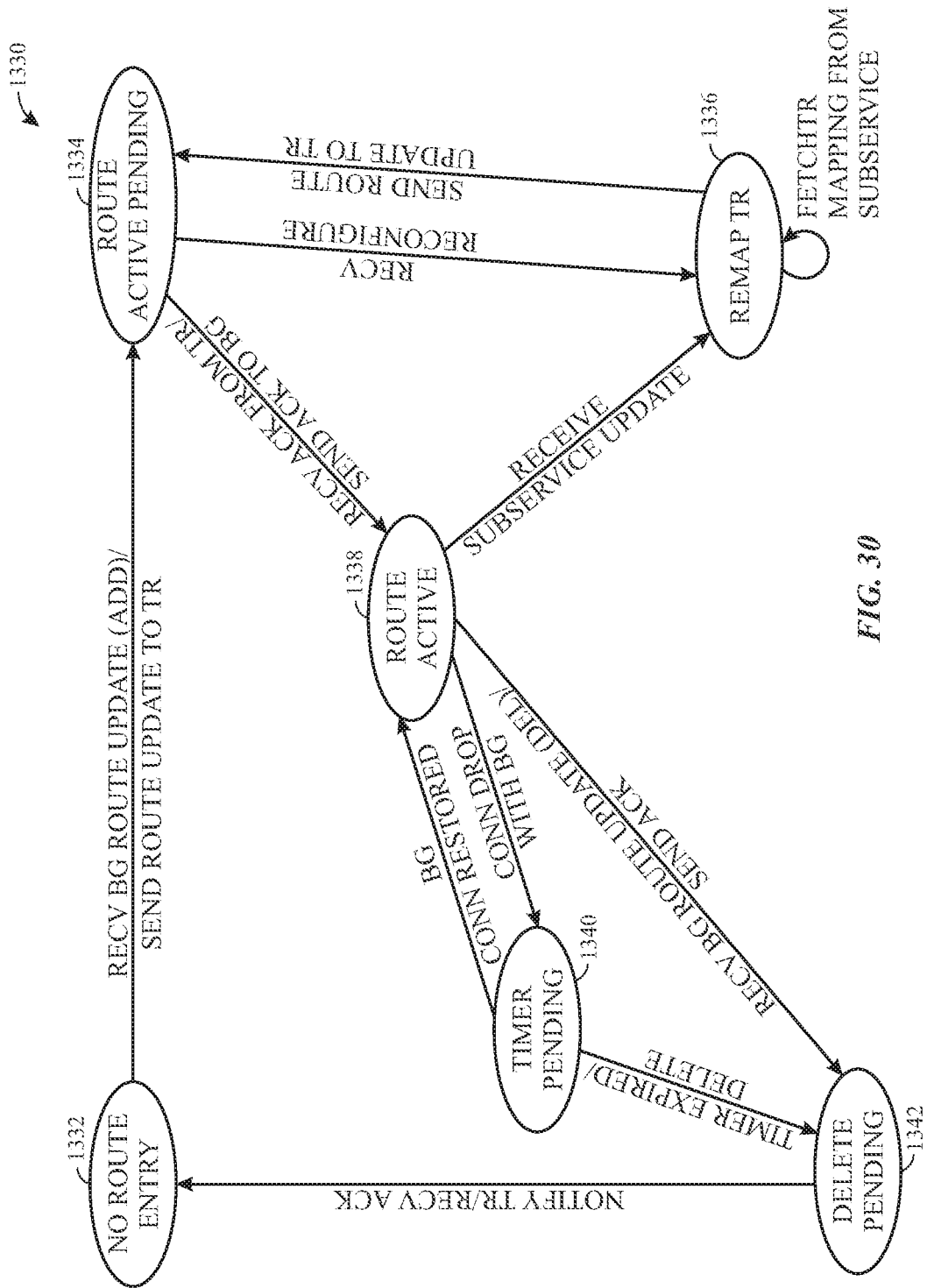
FIG. 30 illustrates a route state machine of the Tunnel FrontEnd of FIG. 27, in accordance with an embodiment.

FIG. 30 illustrates a route entry state machine 1330 for the Tunnel FrontEnd 1170. The Tunnel FrontEnd 1170 begins with a no-routes-entered state 1332. Upon receipt of a Route Update message from the border gateway device 1122, the Tunnel FrontEnd 1170 sends an update to the Tunnel Router 1171 and waits in a route active pending state 1334. If the Tunnel FrontEnd 1170 receives a Reconfigure message due to improper Tunnel Router contact, the Tunnel FrontEnd 1170 enters into a remapping Tunnel Router state 1336 where it attempts to map to the proper Tunnel Router 1171. However, if the Tunnel FrontEnd 1170 receives an acknowledgment from the Tunnel Router 2270, the Tunnel FrontEnd 1170 enters a route active state 1338. From the route active state, if an update is made to the Tunnel Router from the service 1074, the Tunnel FrontEnd 1170 reenters the remapping Tunnel Router state 1336.

If the connection to the border gateway device 1122 is lost during the route active state 1338, the Tunnel FrontEnd waits for a period of time in a timer pending state 1340. If the timer expires without reestablishing the connection, the Tunnel FrontEnd 1170 attempts to delete the border gateway device 1122 and enters a delete pending state 1342. Otherwise, the Tunnel FrontEnd 1170 reenters the route active state 1338. Once the delete has been completes for a pending delete pending state 1342, the Tunnel FrontEnd 1170 reenters the no-routes-entered state 1332.

iii. Tunnel Router State Machines

Figure 31:
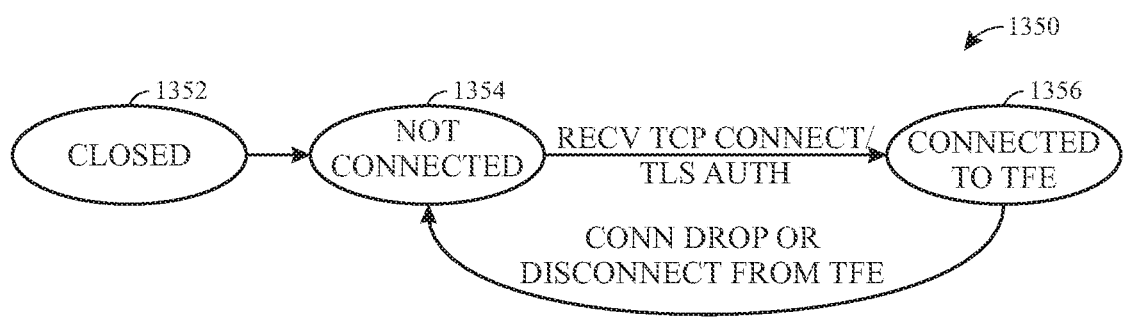
FIG. 31 illustrates a connection state machine of a Service Router, in accordance with an embodiment.

FIG. 31 illustrates a connection state machine 1350 for the Tunnel Router 1171. Initially, the Tunnel Router 1171 is in a closed state 1352 when it is not open to conducting a tunnel. Once the Tunnel Router 1171 is available, it is placed in an unconnected state 1354 waiting for a connection. Upon receipt of a proper TCP connection request from a Tunnel FrontEnd 1171, the Tunnel Router 1171 enters into a connected state 1356 where the tunnel is active. When connection to the Tunnel FrontEnd 1171 is dropped or disconnected by request, the Tunnel FrontEnd 1171 reenters the unconnected state 1354.

Figure 32:
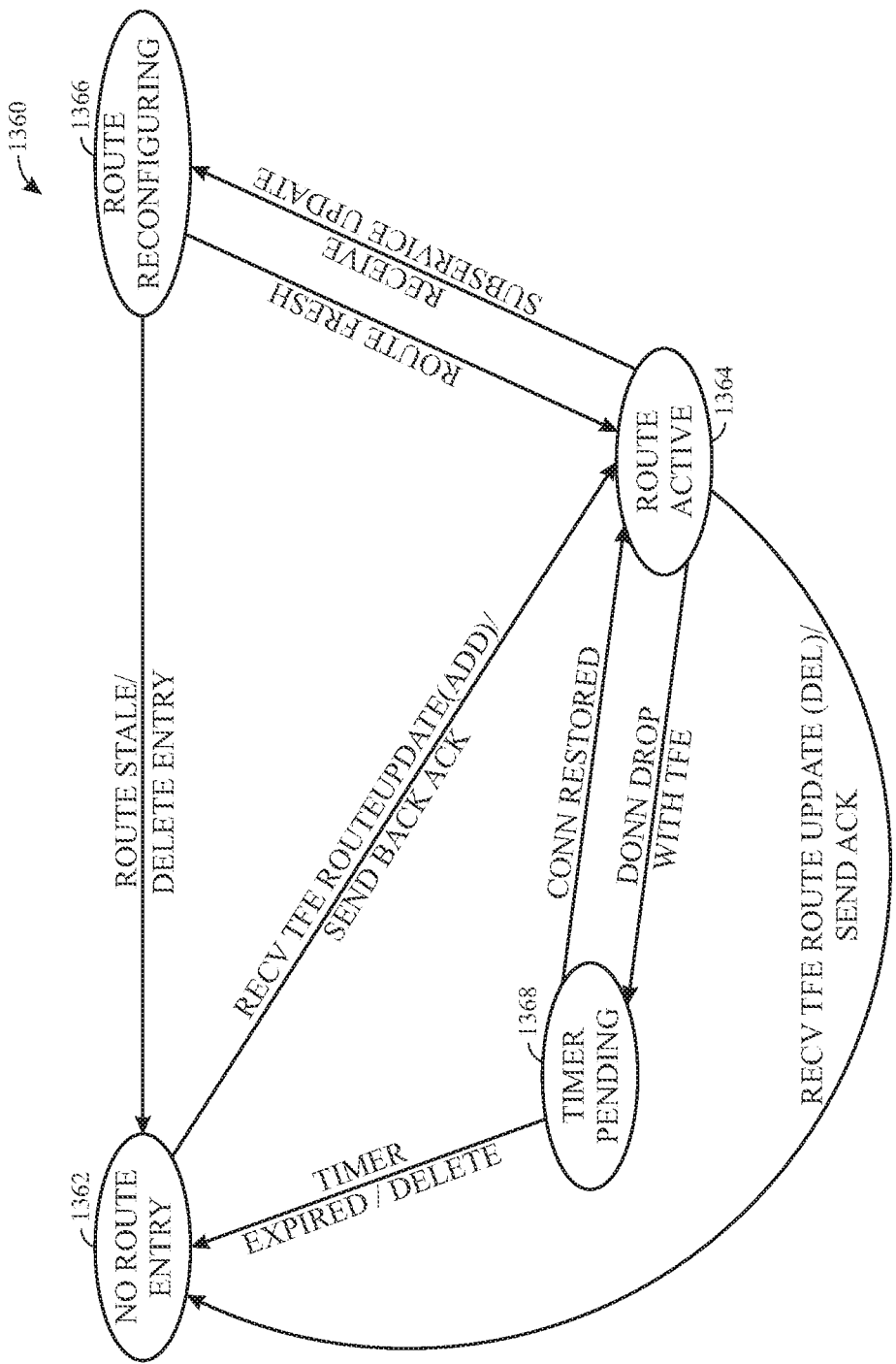
FIG. 32 illustrates a route state machine of the Service Router of FIG. 31, in accordance with an embodiment.

FIG. 32 illustrates a route state machine 1360 for the Tunnel Router 1171. The Tunnel Router 1171 begins with a no-routes-entered state 1362. Upon receipt of a route update or add message, the Tunnel Router 1171 enters a route active state 1366. If the Tunnel Router 1171 receives a subservice update, the Tunnel Router 1171 enters into a route reconfiguring state 1366. If the route is fresh and to be active, the Tunnel Router 1171 reenters the route active state 1364 otherwise, the Tunnel Router 1171 reenters the no-routes-entered state 1362.

If, during the route active state, the Tunnel Router 1171 loses connection to the border gateway device 1122, the Tunnel Router 1171 starts a timer and enters a timer pending state 1368 where it waits for re-connection to the Tunnel FrontEnd 1170. If connection is reestablished, the Tunnel Router 1171 returns to the route active state 1364. If connection is not reestablished before the timer elapses, the Tunnel Router 1362 deletes the route and reenters the no-routes-entered state 1362.

C. Routing Table Model

As noted previously, the Routing table at the Tunnel FrontEnd 1171 and the Tunnel Router 1171 stores the routing information between the devices (e.g., border gateway device 1122, the Tunnel FrontEnd 1171, and the Tunnel Router 1171). Routing control messages would, effectively, be modifying these tables and all data messages would perform a lookup into this table for finding the right destination.

The Route Tables are indexed primarily by the IP (e.g., IPv6) prefix. If there are multiple downstream nodes attached which can serve the same prefix, a uniformly random index may be chosen. The Route state is also maintained within the table. Moreover, a monotonically increasing version field is maintained for the local version (and also an upstream version for the Tunnel FrontEnd), and an effort is to be made to keep the upstream version equal to the local version. If the former is less, then a Route-Update is sent to update and upon receipt of an acknowledgment, the upstream version field is updated.

i. Tunnel Front End Route Table ii. Tunnel (BackEnd) Router Route Table

All the fields are identical in the Route table for the Tunnel BackEnd Router except that it does not have the Upstream version.

TABLE 2

Tunnel Router route table

| Prefix | Fabric Id | Active Conns List | Route State | Lifetime | Local Version |
|---|---|---|---|---|---|
| fd<GlobalId><sub>::/64 | 64 bit fabric Id | Tunnel Front End Id | Route Update FSM state | Route Lifetime left | |

D. Mobile Device Support

This section would explain the modifications that are required within Weave to have the transient devices participate in the Tunneling protocol and enable them to interact with other devices within the home. The tunnel to the transient device would carry the IPv6 packet as payload and since the application program initiates the tunnel, it would need to be able to parse IPv6 and UDP headers. Moreover, when sending a packet down the tunnel, the application program formulates the IPv6 and UDP headers as well.

In order to provide this capability, a Mini UDP/IP stack would may be used within the Inet layer that would provide this option to conditionally formulate/parse these headers before sending the packet through the tunnel.

Apart from UDP/IP, this stack would also perform certain basic ICMP features for network error handling. The primary reason to have this Mini UDP/IP stack is because the kernel tunnel features would not be readily usable by the application program on certain phone operating systems (e.g., iOS) because of restricted privileges.

E. Tunnel Shortcut

Mobile devices operating within the home network use IPv6 to directly communicate with devices operating on the local WiFi network. This communication path works without explicit support from the home router, due to the way the IPv6 Neighbor Discovery protocol works. Devices connected on the home WiFi network advertise the existence of a protocol-specific IPv6 subnet on the network, and mobile devices on that network automatically assign themselves addresses within that subnet. The subnet uses a IPv6 ULA prefix that corresponds to the fabric addressing scheme allowing for a uniform addressing model across the fabric. This behavior is based on a standard IPv6 protocol known as Stateless Address Autoconfiguration (SLAAC) which is supported by most modern mobile and desktop operating systems.

TABLE 1

Tunnel FrontEnd route table

| Prefix | Fabric Id | Active Connections List | Route State | Lifetime | Local Version | Upstream Version |
|---|---|---|---|---|---|---|
| fd<GlobalId><sub>::/64 | 64 bit fabric Id | Border Gateway Node Id list | Route Update FSM state | Route Lifetime left | | |

Despite widespread support for SLAAC, however, the current mobile-to-device communication model is limited by two factors: lack of support for non-WiFi devices, and operating system bugs that interfere with proper IPv6 behavior.

The ability for mobile devices on the WiFi network to communicate with devices that only have a non-WiFi interface is ultimately gated by the presence of an intermediate node that can act as a WiFi to non-WiFi network router. For this routing to work, however, mobile devices know that such a router exists, and, they have an entry in their routing table that directs packets through the routing device. In some embodiments, direct manipulation of the routing table by application programs may be restricted for security reasons. And while standard protocols do exist to allow routers to advertise their ability to route to other networks (e.g. RFC-4191), these protocols are not widely supported in mobile operating systems. Thus, there is presently no means to enable remote subnet routing for standard mobile devices.

Over time it is likely that these limitations will be fixed by the OS providers. In the meantime, a communication mechanism may be used to work around these limitations while still providing the full set of functionality required for mobile devices to participate in a network of connected devices.

F. Tunnel Shortcut

This scheme proposes that, while the mobile is connected to the home WiFi, instead of sending packets directly to a destination node or router, the transient device tunnels the packets into the home network in much the same way as happens when the mobile is outside the home. However, in this case, instead of sending the packets via the service, the tunneled IPv6 packets are communicated directly a local device acting as a tunnel peer.

In effect, the tunneling of packets over the local WiFi represents a kind of shortcut that allows packets to bypass the service while still logically traversing the tunnel. The form of the tunneled packets as they transit the shortcut is effectively identical to that which traverses the link to the service. But the communication occurs in a way that avoids the limitations of direct IPv6 communication. This design also has the benefit of reusing the existing tunneling code in both the local and mobile devices, avoiding the overhead of a new protocol implementation.

a. Discovering Shortcuts

The choice as to whether a packet can take a tunnel shortcut is determined dynamically by discovering the possibility of the shortcut in the local WiFi network. For this purpose, the discovery mechanism leverages the existing protocol. Mobiles seeking a shortcut for a packet use an existing Identify protocol to search for a local device that can route tunneled packets for the destination fabric. This may use a minor extension to the current Identify protocol, as described below.

For packets being routed from a device on the WiFi network to a local mobile, the device searches for the mobile using the mobile's protocol node id. The mobile answers protocol Identify requests in a similar manner to other devices.

b. Extensions to the Identify Protocol

When a transient device attempts to determine whether a tunnel shortcut is possible it sends a multicast Identify request over the local WiFi network to locate a tunnel peer device. To allow this to happen, a new flag (kTargetMode_TunnelRouter) will be added to the TargetModes field.

The semantics of this flag will be such that, whenever it is set, only devices that are willing to tunnel packets will respond.

Additionally, the presence of the TunnelRouter flag will alter the way the device interprets the TargetFabricId field. If the TunnelRouter flag is set and the TargetFabricId is present (and doesn't contain one of the special values Any, AnyFabric, etc.), the device will only compare the bottom 40 bits of the given value against its own fabric id. This portion of the fabric id corresponds to the global id within the fabric's IPv6 ULA prefix. Thus, a transient device in possession of a destination fabric address can locate a device willing to route tunneled packets for that address by sending a Identify request with the TunnelRouter flag set and the TargetFabricId set to the global id from the destination address.

c. Shortcut Caching

The result of shortcut discovery is either the address of a peer node on the WiFi network to which packets should be forwarded, or an indication that no such peer exists and that packets should be forwarded to the service. These results are cached for a period of time in both the mobile and the local device. This cache eliminates the need to do shortcut discovery on a per-packet basis.

Caches within local devices are expected to have short lifetimes, on the order of seconds to small numbers of minutes. Because the cache utilization in a local device is proportional to the number of mobiles receiving packets within the cache lifetime, the maximum memory size is expected to be small (e.g., <50 bytes).

To increase rerouting efficiency, some embodiments may include mobile devices invalidate their shortcut cache whenever they detect a transition from one WiFi network to another or WiFi to cellular network.

G. Mobile to Device Flow Diagram

Figure 33:
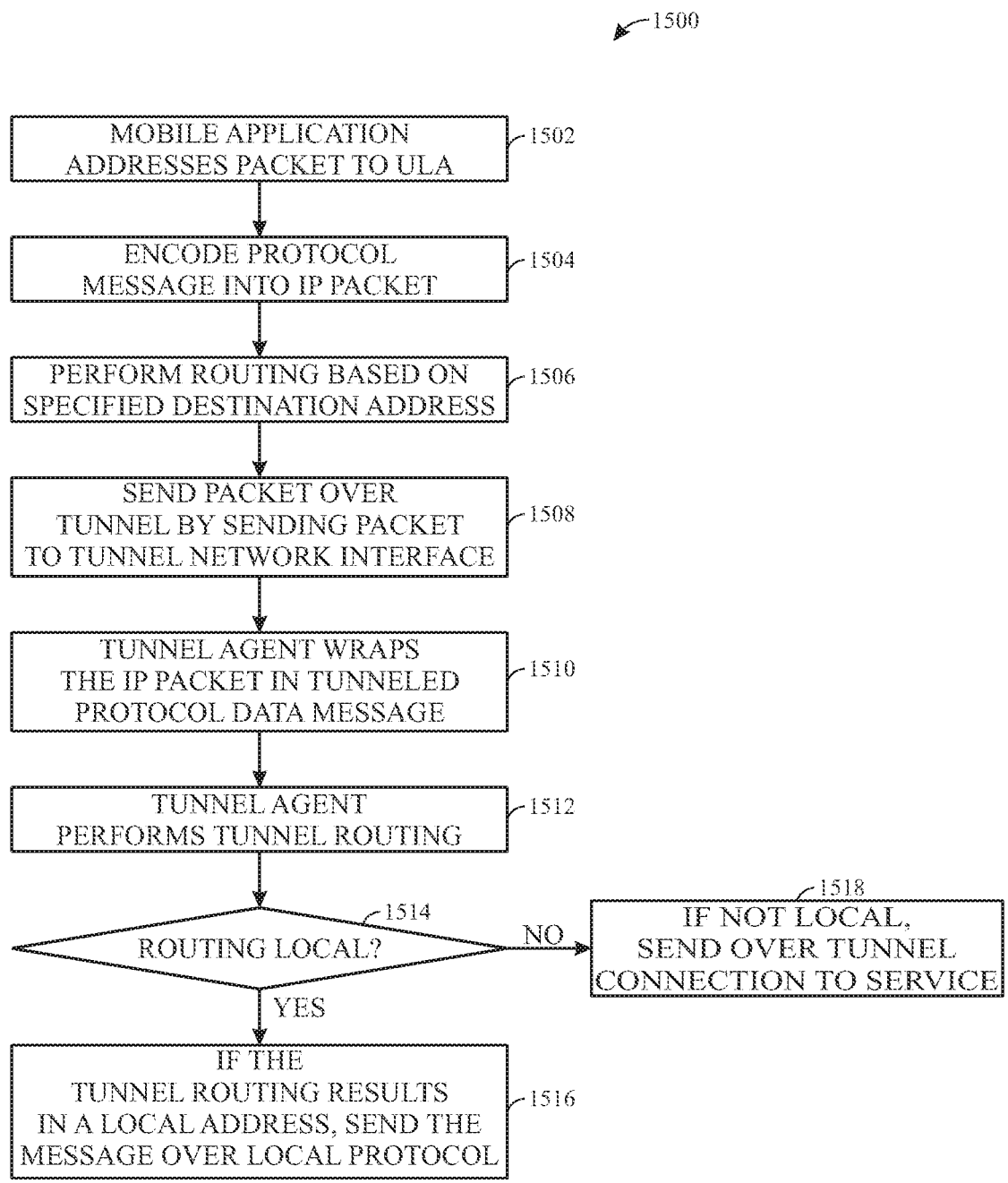
FIG. 33 illustrates a flowchart diagram of a process of packet handling by a transient device, in accordance with an embodiment.

FIG. 33 illustrates a flow diagram of a process 1500 outlining a flow of packets from a mobile application to a device in the home fabric. A mobile application program addresses packet to device (block 1502). The address includes a ULA with a home area network subnet identifier, such as WiFi, Thread (802.15.4), or another suitable subnet. The mini-IP stack in the application program encodes the protocol message into a UDP/IPv6 packet (block 1504). The mini-IP stack in the application program also performs routing based on the specified destination address (block 1506). A routing table in mini-IP stack directs packet to be sent over a tunnel. The mini-IP stack delivers the packet to tunnel network interface, which in turn delivers it to the local tunnel agent via a tunnel endpoint object (block 1508). The tunnel agent wraps the IPv6 packet in a protocol tunneled data message (block 1510). The tunnel agent performs the tunnel routing process, as discussed below, to determine where to forward the packet (block 1512). The result of the routing process is cached for short period of time and used for subsequent packet transmissions. The tunnel agent determines whether the tunnel routing results in a local address (block 1514). If the result of the tunnel routing process is an address of a local node, the tunnel agent sends the tunneled data message to the target address over UDP or another local transfer protocol (block 1516). Otherwise, the tunnel agent sends the tunneled data message over the tunnel connection to the service 1074 (block 1518).

H. Device to Mobile Flow Diagram

Figure 34:
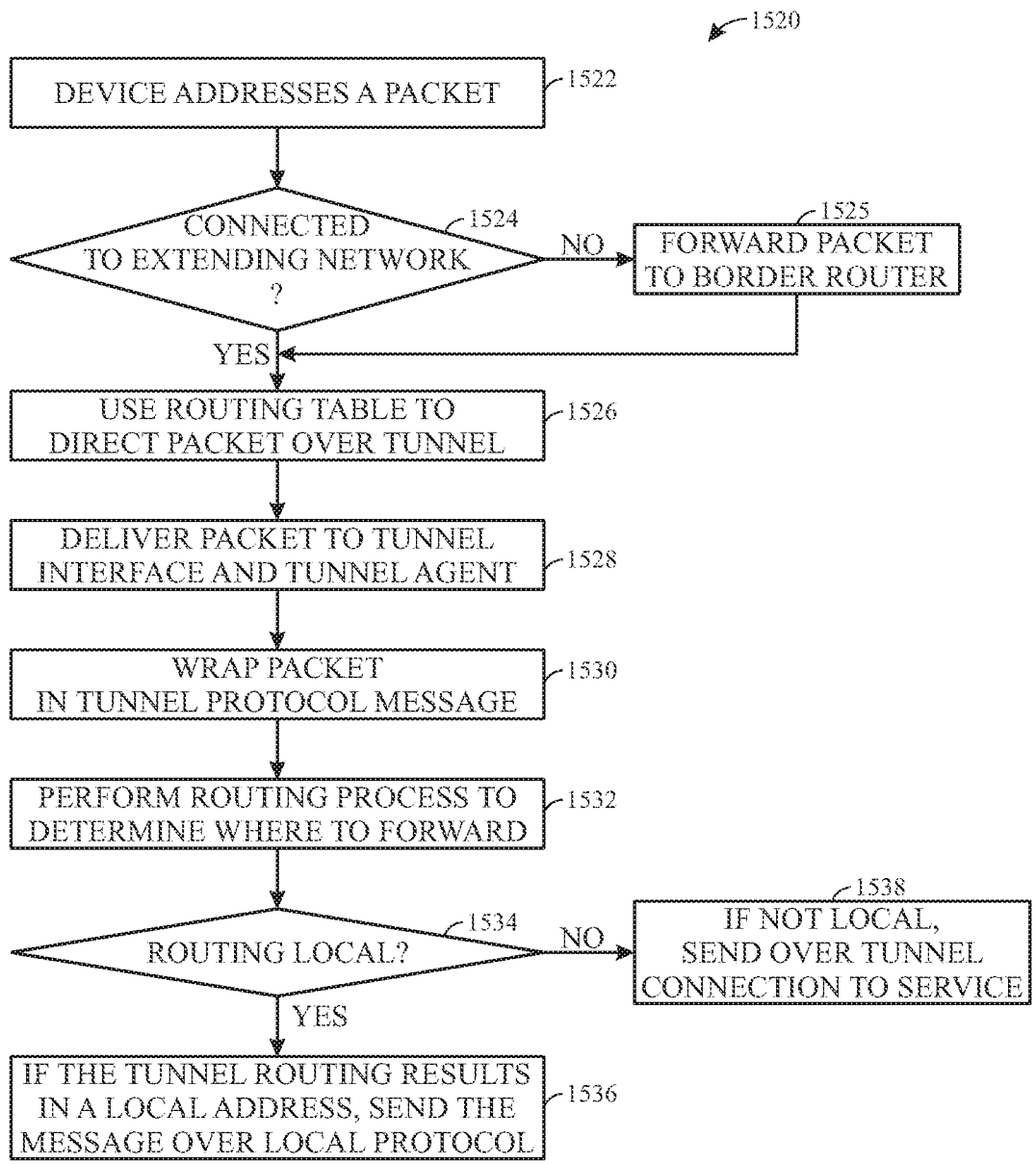
FIG. 34 illustrates a flowchart diagram of a process of packet handling by a fabric device, in accordance with an embodiment.

FIG. 34 illustrates a flow diagram of a process 1520 outlining a flow of packets from a local device to a mobile/transient device. The device addresses a packet to a mobile using the mobile's fabric ULA (block 1522). For example, an application program running on the device may initiate the packet transfer with a mobile/transient subnet identifier indicating that the mobile/transient device may be inside or outside of the local networks. If the device is connected to an extending network (block 1524) that connects to one or more devices that connect to an outside network (e.g., Internet), the device may perform routing directly. However, if the device is not connected an extending network, the packet is forwarded to a border router device for further routing (block 1525).

The routing table in the border router device (either the original device or the device to which the packet has been forwarded) directs the packet to be sent over the tunnel (block 1526). Specifically, the destination address matches a preconfigured fabric route address type pointing to the tunnel and not to routes pointing to the local network interfaces. The router's IP stack delivers the packet to a tunnel interface, which in turn delivers it to the local tunnel agent via tunnel endpoint object (block 1528).

The tunnel agent wraps the IP packet in a protocol tunneled data message (block 1530). The tunnel agent performs the tunnel routing process, as discussed below, to determine where to forward the packet (block 1532). The result of the routing process may be cached for short period of time and used for subsequent packet transmissions.

If the result of the tunnel routing process is an address of a local node (block 1534), the tunnel agent sends the protocol tunneled data message to the target address over a local network technology, such as UDP (block 1536). Otherwise, the tunnel agent sends the protocol tunneled data message over the tunnel connection to the service (block 1538).

I. Tunnel Routing Process Flow Diagram

Figure 35:
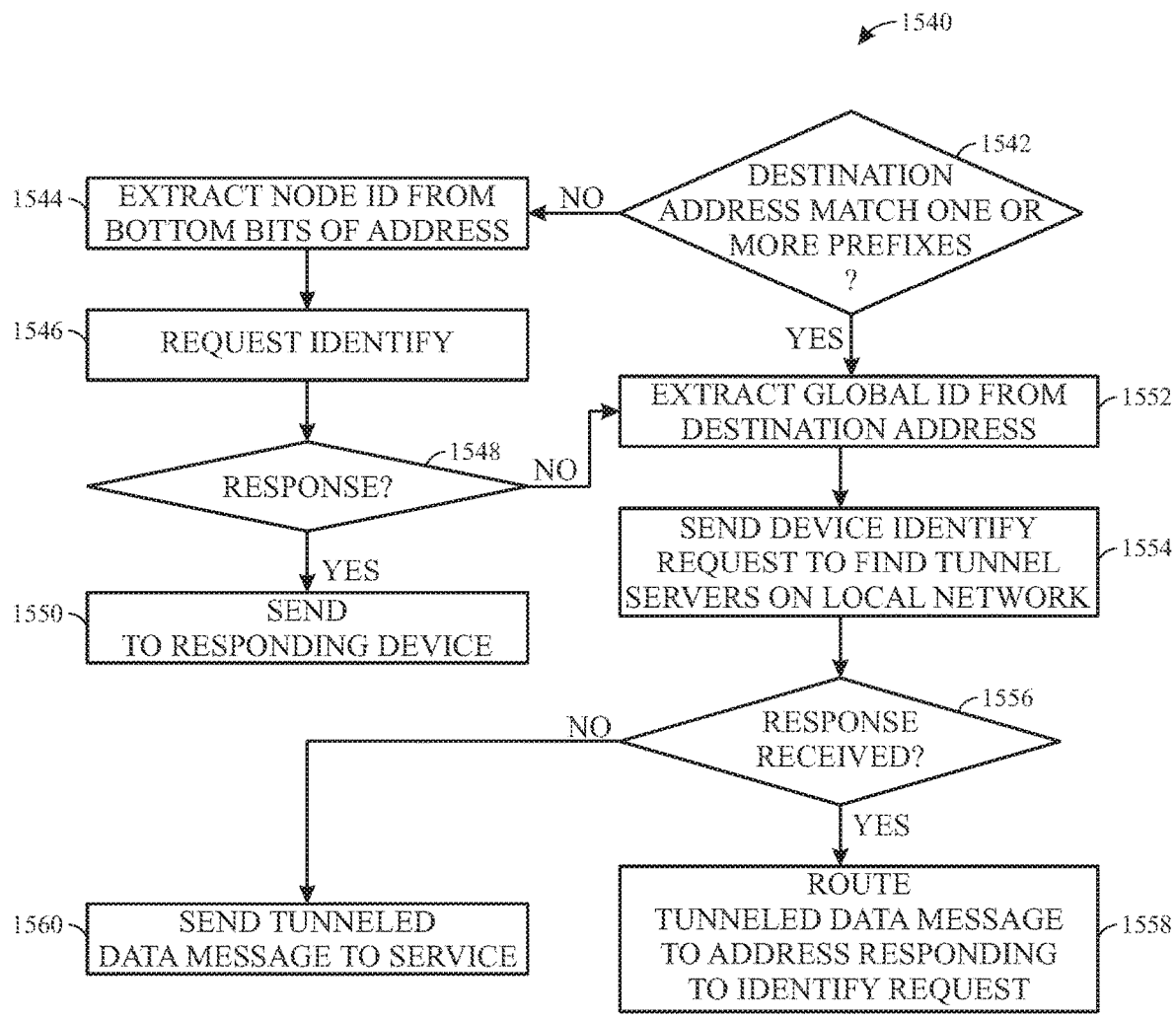
FIG. 35 illustrates a flowchart diagram of a process to be performed by a tunnel agent, in accordance with an embodiment.

FIG. 35 illustrates a process 1540 performed by the tunnel agent to determine how to route a tunneled packet. If the destination address matches specific prefixes (block 1542), the tunnel agent may route such messages directly. For example, the prefixes may include a WiFi fabric prefix or a mobile fabric prefix. If the destination matches the specific prefixes, the tunnel agent extracts the node id from a portion of the destination address (block 1544). For example, the tunnel agent may extract the node id from a number (e.g., 64) of bottom (or top) bits of the destination identifier. The tunnel agent sends one or more multicast/broadcast Device Identify requests looking for a device on the local network(s) with a matching node id (block 1546). For example, the device identify may be over IPv6 or IPv4. If a response is received (block 1548), the tunnel agent routes the protocol tunneled data message to the source address from which the Identify response was received (block 1550).

If no response is received, the tunnel agent extracts the global id from the destination address (block 1552). The tunnel agent sends one or more multicast/broadcast Device Identify requests looking for devices on the local WiFi that are willing to act as tunnel servers for the given global id (block 1554). For example, the device identify may be over IPv6 or IPv4. If a response is received, the tunnel agent routes the protocol tunneled data message to the source address from which the Identify response was received (block 1558). Otherwise, the tunnel agent sends the Weave tunneled data message over the tunnel connection to the service (block 1560).

J. Redundant Tunnels

Figure 36:
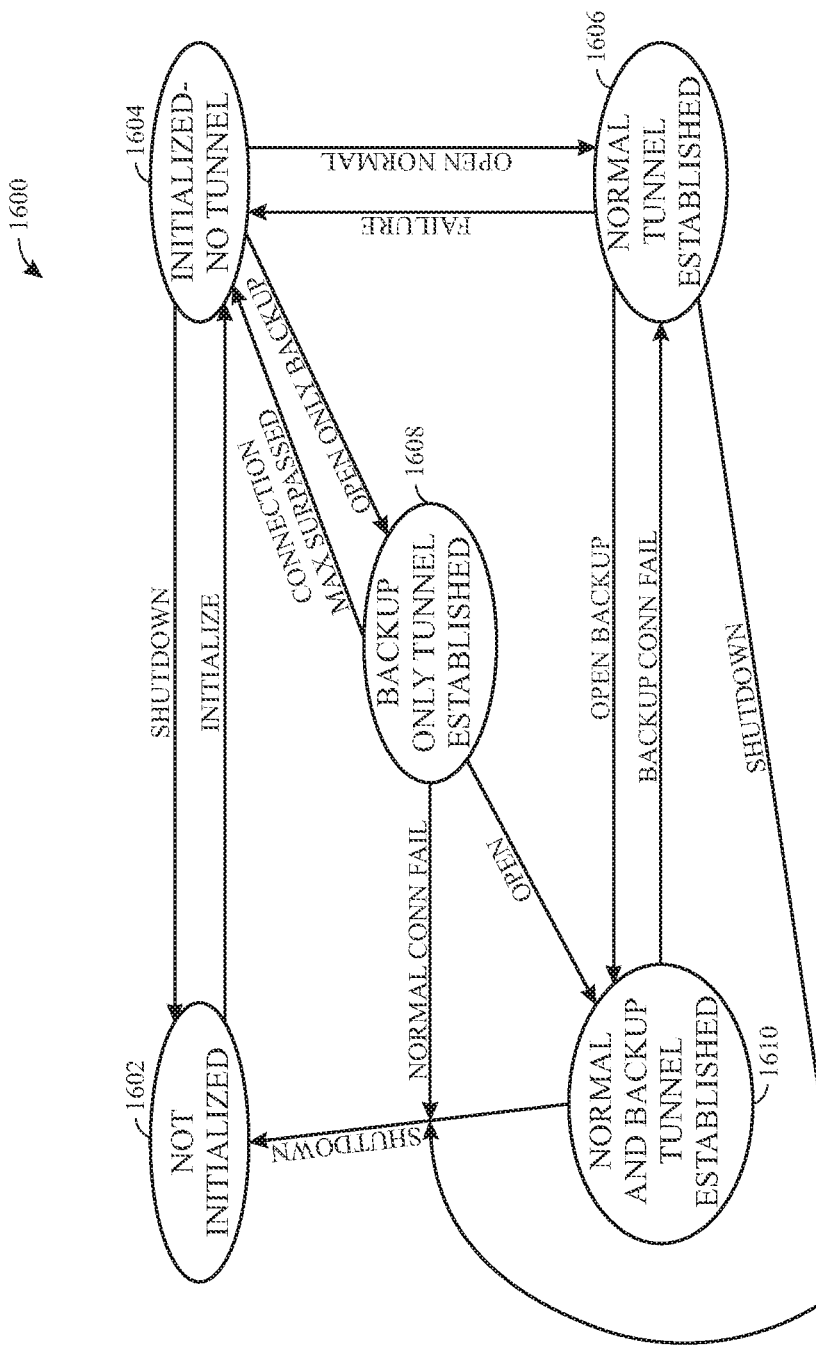
FIG. 36 illustrates a state machine of a tunnel agent process employing redundant tunnels with at least one backup tunnel.

As previously noted, some devices may have two or more tunnels concurrently for redundancy and reliability of the connection. FIG. 36 illustrates a flowchart diagram 1600 of a state machine that may be deployed by the tunnel agent in such embodiments. The tunnel agent starts at the Not-Initialized state 1602 and upon initialization of the tunnel, transitions to the Initialized-NoTunnel state 1604. The other states are a normal-tunnel-only state 1606, a backup-tunnel-only state 1608, and a dual tunnel state 1610. Using foregoing discussed processes for tunnel establishment each tunnel proceeds toward a tunnel open state.

Upon tunnel failure (i.e., maximum retry attempts exceeded) the mode change notification is issued and depending upon which tunnel failed, the state transitions to reflect which mode the WeaveTunnelAgent is in, based on which tunnel is still up.

When both tunnels or the solitary tunnel fail, a return to the Initialized-NoTunnel state 1602 again, and a No-Tunnel notification is issued. When the WeaveTunnelAgent shuts down in any of these states, it closes any outstanding tunnel connection and issues a notification about the Tunnel closures and transitions to the Not-Initialized state 1602 unless it was in the Initialized-NoTunnel state when the shutdown occurred.

The specific embodiments described above have been shown by way of example, and it should be understood that these embodiments may be susceptible to various modifications, combinations, and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory, computer-readable medium comprising instructions executable by a processor of a sensor device to configure the processor to:
   transmit, to a remote service using a tunneled connection through multiple networks of a fabric network, a packet of information in a message using a Weave communication protocol that is common to devices in the fabric network, the message comprising a data packet that includes a tunnel header and an application payload;
   the tunnel header comprising:
      a length field indicating a length of the message;
      a message header field configured to indicate:
         a message type indicating that the message includes the packet of information is that is to be transmitted via a tunnel; and
         a security indicator to indicate whether security information is included in the message;
      a version field indicating a version of message format being used;
      a packet length field indicating a length of a tunneled message; and
      a packet field that carries the packet of information.

2. The non-transitory, computer-readable medium of claim 1, wherein the message comprises a packet length field immediately preceding the message header field, and wherein the packet length field indicates a length of an enclosing packet enclosing the packet.

3. The non-transitory, computer-readable medium of claim 1, wherein the instructions are executable to cause the processor to overlay the packet on a profile of a plurality of profiles, and wherein each profile of the plurality of profiles comprises a set of schema for encoding and decoding messages.

4. The non-transitory, computer-readable medium of claim 3, wherein the overlaid profile comprises:

a core profile comprising a set of basic schemas;
a data management profile comprising a set of data management schemas that enables the managing and accessing remote data;
a bulk data transfer profile comprising a set of bulk data transfer schemas that enables bulk transfers of data between electronic devices; or
a status reporting profile comprising a set of status reporting schemas that enables sending or receiving status information within the fabric network.

5. The non-transitory, computer-readable medium of claim 1, wherein the instructions are executable to cause the processor to encode the packet in a tag-length-value format.

6. The non-transitory, computer-readable medium of claim 1, wherein the message comprises a source ID flag that indicates whether a source address for a device is included in the message, and wherein the source address indicates a sending device formatted in a Unique Local Address format comprising:
a global ID having 40 bits of data configured to identify the fabric network in which the sending device is connected;
a subnet ID having 16 bits of data configured to identify a logical network in the fabric network in which the sending device is connected; or
an interface ID having 64 bits of data configured to identify the sending device.

7. The non-transitory, computer-readable medium of claim 1, wherein the message comprises a destination ID flag that indicated whether a destination address is included in the message, wherein the destination address indicates a destination device that is connected to the fabric network, and wherein the destination address is formatted in a Unique Local Address format comprising:
a global ID having 40 bits of data configured to identify the fabric network in which the destination device is connected;
a subnet ID having 16 bits of data configured to identify a logical network in the fabric network in which the destination device is connected; and
an interface ID having 64 bits of data configured to identify the destination device.

8. The non-transitory, computer-readable medium of claim 1, wherein the message comprises a message integrity check field that has a length based at least in part on an encryption type indicated by an encryption type field in the message header.

9. The non-transitory, computer-readable medium of claim 8, wherein the message comprises:
a key ID field that indicates an encryption or message integrity key used to encrypt the message indicated by the encryption type field;
an initialization vector field that comprises an initialization vector used to encrypt the message indicated by the encryption type field;
a padding field comprising a length of bytes representing cryptographic padding added to the message to make an encrypted portion of the message evenly divisible by an encryption block size; or
a message signature field located at an end of the message, wherein the message signature field includes a cryptographic signature for the message based at least in part on a signature type indicated by a signature type field.

10. The non-transitory, computer-readable medium of claim 1, wherein the data packet encloses an Internet Protocol packet that encloses a Uniform Datagram Protocol packet.

11. The non-transitory, computer-readable medium of claim 1, wherein the data packet includes:
the message header field comprising:
an addressing indicator to indicate whether addressing information is included in the message; and
a message ID field configured to identify a message with an identifier that is unique for a device in the fabric network that encodes or sends the message, wherein the message ID field follows the message header field.

12. The non-transitory, computer-readable medium of claim 1, wherein the packet is transmitted via at least one of a plurality of networks, and wherein one of the plurality of networks is a low-power wireless mesh network.

13. The non-transitory, computer-readable medium of claim 12, wherein the low-power wireless mesh network comprises an 802.15.4 wireless network.

14. The non-transitory, computer-readable medium of claim 13, wherein a second network of the plurality of networks comprises an 802.11 wireless network.

15. An electronic device comprising:
a processor; and
memory, comprising instructions executable by the processor to configure the electronic device to:
transmit, to a remote service using a tunneled connection through multiple networks of a fabric network, a packet of information in a message using a Weave communication protocol that is common to devices in the fabric network, the message comprising a data packet that includes a tunnel header and an application payload;
the tunnel header comprising:
a length field indicating a length of the message;
a message header field configured to indicate:
a message type indicating that the message includes the packet of information is that is to be transmitted via a tunnel; and
a security indicator to indicate whether security information is included in the message;
a version field indicating a version of message format being used;
a packet length field indicating a length of a tunneled message; and
a packet field that carries the packet of information.

16. The electronic device of claim 15, wherein the message comprises a packet length field immediately preceding the message header field, and wherein the packet length field indicates a length of an enclosing packet enclosing the packet.

17. The electronic device of claim 15, wherein the data packet encloses an Internet Protocol packet that encloses a Uniform Datagram Protocol packet.

18. The electronic device of claim 15, wherein the packet is transmitted via at least one of a plurality of networks, and wherein one of the plurality of networks is a low-power wireless mesh network.

19. The electronic device of claim 18, wherein the low-power wireless mesh network comprises an 802.15.4 wireless network, and wherein a second network of the plurality of networks comprises an 802.11 wireless network.

20. A method for transmitting data by a sensor device in an internetwork of a plurality of networks including a relatively low-power wireless mesh network, the method comprising:
transmitting, to a remote service using a tunneled connection through multiple networks of the internetwork of the plurality of networks, a packet of information in a message using a Weave communication protocol that is common to devices in the internetwork of the plurality of networks, the message comprising a data packet including a tunnel header and an application payload;

the tunnel header comprising:
  a length field indicating a length of the message;
  a message header field configured to indicate:
    a message type indicating that the message includes the packet of information is that is to be transmitted via a tunnel; and
    a security indicator to indicate whether security information is included in the message;
  a version field indicating a version of message format being used;
  a packet length field indicating a length of a tunneled message; and
  a packet field that carries the packet of information.

\* \* \* \* \*